US010298828B2

(12) United States Patent
Hayashi et al.

(10) Patent No.: US 10,298,828 B2
(45) Date of Patent: May 21, 2019

(54) MULTI-IMAGING APPARATUS INCLUDING INTERNAL IMAGING DEVICE AND EXTERNAL IMAGING DEVICE, MULTI-IMAGING METHOD, PROGRAM, AND RECORDING MEDIUM

(71) Applicant: FUJIFILM Corporation, Tokyo (JP)

(72) Inventors: Daisuke Hayashi, Saitama (JP); Hiroyuki Oshima, Saitama (JP); Takeshi Misawa, Saitama (JP); Masaya Tamaru, Saitama (JP); Fuminori Irie, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/449,588

(22) Filed: Mar. 3, 2017

(65) Prior Publication Data

US 2017/0201672 A1    Jul. 13, 2017

Related U.S. Application Data

(63) Continuation of application No. PCT/JP2015/068129, filed on Jun. 24, 2015.

(30) Foreign Application Priority Data

Sep. 11, 2014    (JP) .................................. 2014-184774

(51) Int. Cl.
*H04N 5/04* (2006.01)
*H04N 7/18* (2006.01)
(Continued)

(52) U.S. Cl.
CPC ....... *H04N 5/23203* (2013.01); *G03B 17/561* (2013.01); *G03B 37/02* (2013.01);
(Continued)

(58) Field of Classification Search
CPC ........... H04N 5/23203; H04N 5/23296; H04N 5/23293; H04N 5/44591; H04N 5/247; H04N 5/04
See application file for complete search history.

(56) References Cited

U.S. PATENT DOCUMENTS 9,503,626 B2 * 11/2016 Chang ................ H04N 5/23203
2005/0036044 A1    2/2005 Funakura
(Continued)

FOREIGN PATENT DOCUMENTS

JP    2005-94741 A    4/2005
JP    2006-238020 A    9/2006
(Continued)

OTHER PUBLICATIONS

Japanese Notification of Reasons for Refusal, dated Jan. 15, 2018, for corresponding Japanese Application No. 2016-547741, with an English machine translation.
(Continued)

*Primary Examiner* — Gevell V Selby
(74) *Attorney, Agent, or Firm* — Birch Stewart, Kolasch & Birch, LLP

(57) ABSTRACT

A multi-imaging apparatus includes: a display unit; an internal imaging device that acquires a first live view image or a first image captured by a main imaging operation thereof; a wireless communication unit that performs wireless communication with an external imaging device that acquires a second live view image or a second image captured by a main imaging operation thereof; and a controller. Here, the controller receives an input of the first live view image from the internal imaging device, receives the second live view image from the external imaging device through the wireless communication unit, and causes the
(Continued)

display unit to display the input first live view image and the received second live view image as a multi-live view.

18 Claims, 17 Drawing Sheets

(51) Int. Cl.
| | |
|---|---|
| *G03B 17/56* | (2006.01) |
| *G03B 37/02* | (2006.01) |
| *H04N 5/232* | (2006.01) |
| *H04N 5/247* | (2006.01) |
| *H04N 5/262* | (2006.01) |
| *H04N 5/445* | (2011.01) |

(52) U.S. Cl.
CPC .............. *H04N 5/04* (2013.01); *H04N 5/232* (2013.01); *H04N 5/23293* (2013.01); *H04N 5/23296* (2013.01); *H04N 5/247* (2013.01); *H04N 5/2624* (2013.01); *H04N 5/44591* (2013.01); *H04N 7/18* (2013.01); *H04N 7/181* (2013.01)

(56) References Cited

U.S. PATENT DOCUMENTS

| | | | | |
|---|---|---|---|---|
| 2006/0244812 | A1* | 11/2006 | Jeong | .................... H04N 7/147 |
| | | | | 348/14.1 |
| 2009/0125147 | A1* | 5/2009 | Wang | .................... H04N 7/185 |
| | | | | 700/264 |
| 2011/0007130 | A1* | 1/2011 | Park | ....................... H04N 5/232 |
| | | | | 348/38 |
| 2013/0120606 | A1 | 5/2013 | Iwasaki | |
| 2015/0029350 | A1* | 1/2015 | Matsuda | ................ H04N 5/247 |
| | | | | 348/211.2 |

FOREIGN PATENT DOCUMENTS

| | | |
|---|---|---|
| JP | 2007-158860 A | 6/2007 |
| JP | 2011-172093 A | 9/2011 |
| JP | 2011-250340 A | 12/2011 |
| JP | 2012-99889 A | 5/2012 |
| JP | 2013-93843 A | 5/2013 |
| JP | WO2013/072981 A1 | 5/2013 |
| JP | 2013-255202 A | 12/2013 |

OTHER PUBLICATIONS

International Preliminary Report on Patentability issued in PCT/JP2015/068129 (PCT/IPEA/409), dated Apr. 25, 2016.

International Search Report issued in PCT/JP2015/068129 (PCT/ISA/210), dated Sep. 15, 2015.

Written Opinion of the International Searching Authority issued in PCT/JP2015/068129 (PCT/ISA/237), dated Sep. 15, 2015.

Japanese Decision to Grant a Patent dated Mar. 26, 2018 for corresponding Japanese Application No. 2016-547741, with English translation.

Chinese Office Action and Search Report, dated Jan. 3, 2019, for counterpart Chinese Application No. 201580048410.6, along with an English machine translation of the Chinese Office Action.

* cited by examiner

FIG. 6
<IMAGE POSITIONS>
(1)
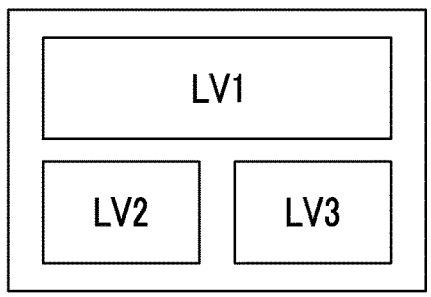
(2)
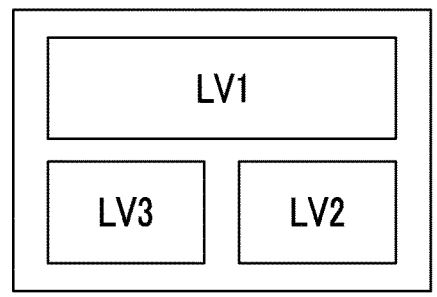
(3)
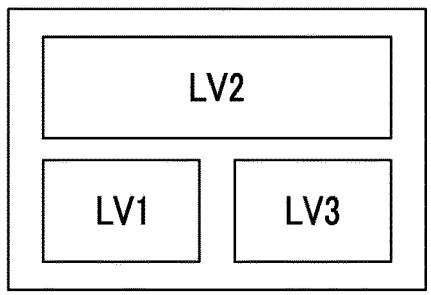
(4)
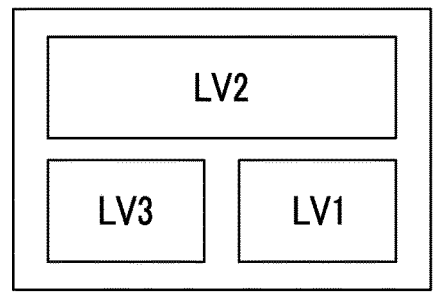
(5)
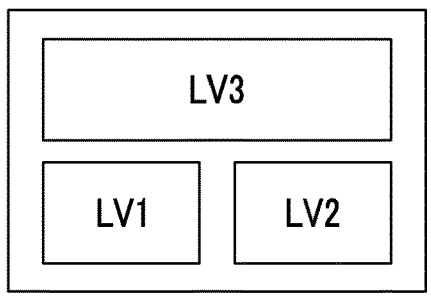
(6)
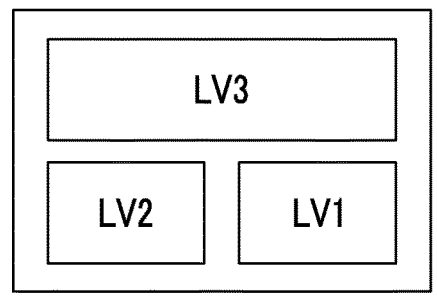

MULTI-IMAGING APPARATUS INCLUDING INTERNAL IMAGING DEVICE AND EXTERNAL IMAGING DEVICE, MULTI-IMAGING METHOD, PROGRAM, AND RECORDING MEDIUM

CROSS-REFERENCE TO RELATED APPLICATIONS

This application is a Continuation of PCT International Application No. PCT/JP2015/068129 filed on Jun. 24, 2015, which claims priority under 35 U.S.C. § 119(a) to Japanese Patent Application No. 2014-184774 filed on Sep. 11, 2014. Each of the above applications is hereby expressly incorporated by reference, in their entirety, into the present application.

BACKGROUND OF THE INVENTION

1. Field of the Invention

The present invention relates to a multi-imaging apparatus, a multi-imaging method, a program, and a recording medium, and particularly, to a multi-imaging apparatus, a multi-imaging method, a program, and a recording medium in which an internal imaging device and an external imaging device are used.

2. Description of the Related Art

In the related art, a technique that generally controls a plurality of cameras that are connected in a wired or wireless manner to acquire a desired image or moving image has been proposed. For example, there is a technique that simultaneously displays respective images or moving images captured by a plurality of monitoring cameras on a display device so that images having a plurality of viewpoints can be simultaneously viewed.

Further, a technique that controls an imaging device using a smartphone or a tablet (hereinafter, simply referred to as a smartphone) has been proposed. For example, JP2013-93843A discloses a technique in which a smartphone and a camera (imaging device) are connected to each other in a wireless manner, an image acquired by the camera is displayed on a display unit of the smartphone, and an instruction is transmitted from the smartphone to the camera.

SUMMARY OF THE INVENTION

However, in a case where a plurality of external imaging devices is connected to a smartphone in a wireless manner, it is necessary that the plurality of external imaging devices for wireless connection is prepared. Further, if the smartphone and the plurality of external imaging devices are connected to each other in a wireless manner, the whole wireless communication traffic increases, which may make wireless communication instable.

JP2013-93843A described above does not mention that there are problems in that wireless communication becomes instable and a communication traffic allocated to each wireless connection decreases according to increase in the number of imaging devices connected to a smartphone, and does not disclose a countermeasure therefor.

In order to solve the above-mentioned problems, an object of the invention is to provide a multi-imaging apparatus, a multi-imaging method, a program, and a recording medium capable of effectively using an imaging device embedded in a smartphone and reducing a communication traffic in wireless connection of the smartphone and the imaging device.

According to an aspect of the invention, there is provided a multi-imaging apparatus comprising: a display unit; an internal imaging device that acquires a first live view image or a first image captured by a main imaging operation thereof; a wireless communication unit that performs wireless communication with an external imaging device that acquires a second live view image or a second image captured by a main imaging operation thereof; and a controller that is connected to the display unit, the internal imaging device, and the wireless communication unit, in which the controller receives an input of the first live view image from the internal imaging device, receives the second live view image from the external imaging device through the wireless communication unit, and causes the display unit to display the input first live view image and the received second live view image as a multi-live view.

According to this aspect of the invention, since multi-imaging is performed by the internal imaging device of the multi-imaging apparatus and the external imaging device connected to the multi-imaging apparatus in a wireless manner, it is possible to effectively use the internal imaging device of the multi-imaging apparatus, and to reduce a wireless communication traffic between the multi-imaging apparatus and the external imaging device.

Preferably, the multi-imaging apparatus further comprises a storage unit, and the controller acquires the first image and the second image captured by the main imaging operations of the internal imaging device and the external imaging device, respectively, composes the acquired first image and second image in the same form of that of the live view images displayed as the multi-live view, and stores an image obtained by the composition in the storage unit.

According to this aspect of the invention, since the first image and the second image captured by the main imaging operations are composed in the same form of that of the live view images displayed as the multi-live view and are stored in the storage unit, it is possible to store a multi-image which is the same as live view images.

Preferably, the external imaging device includes a mechanical pan/tilt mechanism or an electronic pan/tilt mechanism that displays only a specific region in the second image to perform a pan/tilt control.

According to this aspect of the invention, the external imaging device includes the mechanical pan/tilt mechanism or the electronic pan/tilt mechanism. Thus, according to this aspect of the invention, in a case where the external imaging device includes the mechanical pan/tilt mechanism, it is possible to perform wide-range imaging, and in a case where the external imaging device includes the electronic pan/tilt mechanism, it is possible to cut a desired image using a pan operation or a tilt operation for display.

Preferably, the controller acquires subject specifying information for specifying a subject captured by the internal imaging device, displayed on the display unit, and transmits a pan/tilt driving instruction for controlling a pan/tilt mechanism of the external imaging device so that the subject captured by the internal imaging device is also captured by the external imaging device based on the subject specifying information, to the external imaging device.

According to this aspect of the invention, since the pan/tilt mechanism of the external imaging device is controlled to capture a subject based on the subject specifying information for specifying the subject captured by the internal imaging device, it is possible for the external imaging device to capture the same subject as that captured by the internal imaging device.

Preferably, the controller acquires position information of the internal imaging device and the external imaging device, acquires posture information of the internal imaging device and the external imaging device, and transmits a pan/tilt driving instruction for controlling the pan/tilt mechanism of the external imaging device so that the subject captured by the internal imaging device is also captured by the external imaging device based on the position information and the posture information, to the external imaging device.

According to this aspect of the invention, since the pan/tilt mechanism of the external imaging device is controlled to capture a subject based on the position information and the posture information, it is possible for the external imaging device to capture the same subject as that captured by the internal imaging device.

Preferably, the controller acquires distance information indicating a distance between the internal imaging device and the subject, and transmits a pan/tilt driving instruction for controlling the pan/tilt mechanism of the external imaging device so that the subject captured by the internal imaging device is also captured by the external imaging device based on the position information, the posture information, and the distance information, to the external imaging device.

According to this aspect of the invention, since the pan/tilt mechanism of the external imaging device is controlled to capture a subject based on the position information, the posture information, and the distance information, it is possible for the external imaging device to capture the same subject as that captured by the internal imaging device.

Preferably, the controller acquires posture information of the multi-imaging apparatus, and transmits a pan/tilt driving instruction for controlling the pan/tilt mechanism of the external imaging device in association with the posture information to the external imaging device.

According to this aspect of the invention, since the pan/tilt mechanism of the external imaging device is controlled in association with the posture information of the multi-imaging apparatus, it is possible to intuitively control the pan/tilt mechanism of the external imaging device using the multi-imaging apparatus.

Preferably, the multi-imaging apparatus further comprises an operation unit for instructing a main imaging operation, and the controller transmits, if a main imaging operation is instructed by the operation unit, an imaging instruction for instructing the main imaging operation of the external imaging device to the external imaging device.

According to this aspect of the invention, since the main imaging operation of the external imaging device is instructed by the operation unit included in the multi-imaging apparatus, it is possible to control the main imaging operation of the external imaging device using the multi-imaging apparatus.

Preferably, the controller causes, if a main imaging operation is instructed by the operation unit, the internal imaging device and the external imaging device to perform the main imaging operations in synchronization.

According to this aspect of the invention, since the main imaging operation of the internal imaging device is instructed in synchronization with transmission of the instruction of the main imaging operation to the external imaging device and the main imaging operation of the internal imaging device and the external imaging device are performed at the same time, it is possible to acquire images captured by the main imaging operations at the same timing.

Preferably, the internal imaging device includes a first imaging unit and a second imaging unit, and the controller acquires the first live view image or the first image from both or one of the first imaging unit and the second imaging unit.

According to this aspect of the invention, since the internal imaging device includes the first imaging unit and the second imaging unit, it is possible for the internal imaging device to acquire images having different viewpoints.

Preferably, the external imaging device includes a mechanical pan/tilt mechanism or an electronic pan/tilt mechanism that displays only a specific region in the second image to perform a pan/tilt control, and the controller transmits, in a case where switching between imaging of the first imaging unit and imaging of the second imaging unit is performed, an automatic tracking instruction for instructing the external imaging device to perform automatic tracking based on driving of the pan/tilt mechanism to the external imaging device.

According to this aspect of the invention, since it is possible to cause the pan/tilt mechanism of the external imaging unit to perform automatic tracking according to switching between the first imaging unit and the second imaging unit. Thus, by performing switching between the first imaging unit and the second imaging unit of the multi-imaging apparatus, it is possible to control the start of automatic tracking of the external imaging unit using the multi-imaging apparatus.

According to another aspect of the invention, there is provided an imaging apparatus that transmits the second live view image or the second image to the above-described multi-imaging apparatus.

According to still another aspect of the invention, there is provided a multi-imaging method comprising: an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, in which the first live view image is input in the internal imaging step and the second live view image is received in the external imaging step, and the method further comprising: a display step of displaying the first live view image and the second live view image as a multi-live view.

Preferably, the multi-imaging method further comprises: a step of acquiring the first image and the second image captured by the main imaging operations in the internal imaging step and the external imaging step; a step of composing the acquired first image and second image in the same form of that of the live view images displayed as the multi-live view; and a step of storing an image obtained by the composition.

Preferably, the external imaging step includes a step of acquiring the second live view image or the second image captured by the external imaging device that includes a mechanical pan/tilt mechanism or an electronic pan/tilt mechanism that displays only a specific region in the second image to perform a pan/tilt control.

Preferably, the multi-imaging method further comprises: a step of acquiring subject specifying information for specifying a subject captured in the internal imaging step; and a step of transmitting a pan/tilt driving instruction for controlling the pan/tilt mechanism of the external imaging device so that the subject captured in the internal imaging step is also captured by the external imaging device based on the subject specifying information, to the external imaging device.

Preferably, the multi-imaging method further comprises: a step of acquiring position information of an internal imaging device in which the internal imaging step is performed and the external imaging device; a step of acquiring posture information of the internal imaging device and the external imaging device; and a step of transmitting a pan/tilt driving instruction for controlling the pan/tilt mechanism of the external imaging device so that the subject captured by the internal imaging device is also captured in the external imaging step based on the position information and the posture information, to the external imaging device.

Preferably, the multi-imaging method further comprises: a step of acquiring distance information indicating a distance between the internal imaging device and the subject; and a step of transmitting a pan/tilt driving instruction for controlling the pan/tilt mechanism of the external imaging device so that the subject captured by the internal imaging device is also captured in the external imaging step based on the position information, the posture information, and the distance information, to the external imaging device.

Preferably, the multi-imaging method further comprises: a step of acquiring posture information of the multi-imaging apparatus, and a step of transmitting a pan/tilt driving instruction for controlling the pan/tilt mechanism of the external imaging device based on the posture information of the multi-imaging apparatus to the external imaging device.

According to still another aspect of the invention, there is provided a program that causes a computer to execute a multi-imaging method comprising: an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, in which the first live view image is input in the internal imaging step and the second live view image is received in the external imaging step, and the method further comprising: a display step of displaying the first live view image and the second live view image as a multi-live view.

According to still another aspect of the invention, there is provided a non-transitory recording medium on which a computer-readable code of the above-described program is recorded.

As a specific "non-transitory recording medium", various types of non-transitory recording mediums such as a read only memory (ROM), an electrically erasable and programmable read-only memory (EEPROM), various types of magneto-optical recording mediums such as a hard disk drive, a compact disc or a digital versatile disc (DVD), or a semiconductor memory such as a solid state drive (SSD) may be used.

According to the invention, since multi-imaging is performed by the internal imaging device of the multi-imaging apparatus and the external imaging device connected to the multi-imaging apparatus in a wireless manner, it is possible to effectively use the internal imaging device of the multi-imaging apparatus, and to reduce a wireless communication traffic between the multi-imaging apparatus and the external imaging device. Thus, it is possible to provide a multi-imaging apparatus, a multi-imaging method, a program, and a recording medium having such a capability.

BRIEF DESCRIPTION OF THE DRAWINGS

FIG. 6 is a diagram illustrating combinations of image positions in layouts.

DESCRIPTION OF THE PREFERRED EMBODIMENTS

Hereinafter, embodiments of a multi-imaging apparatus, a multi-imaging method, and a program according to the invention will be described with reference to the accompanying drawings.

First Embodiment

First, a first embodiment of the invention will be described. In this embodiment, a normal camera is used as an external imaging device 10 (see FIG. 1).

(Appearances of Multi-Imaging Apparatus and External Imaging Device)

Figure 1:
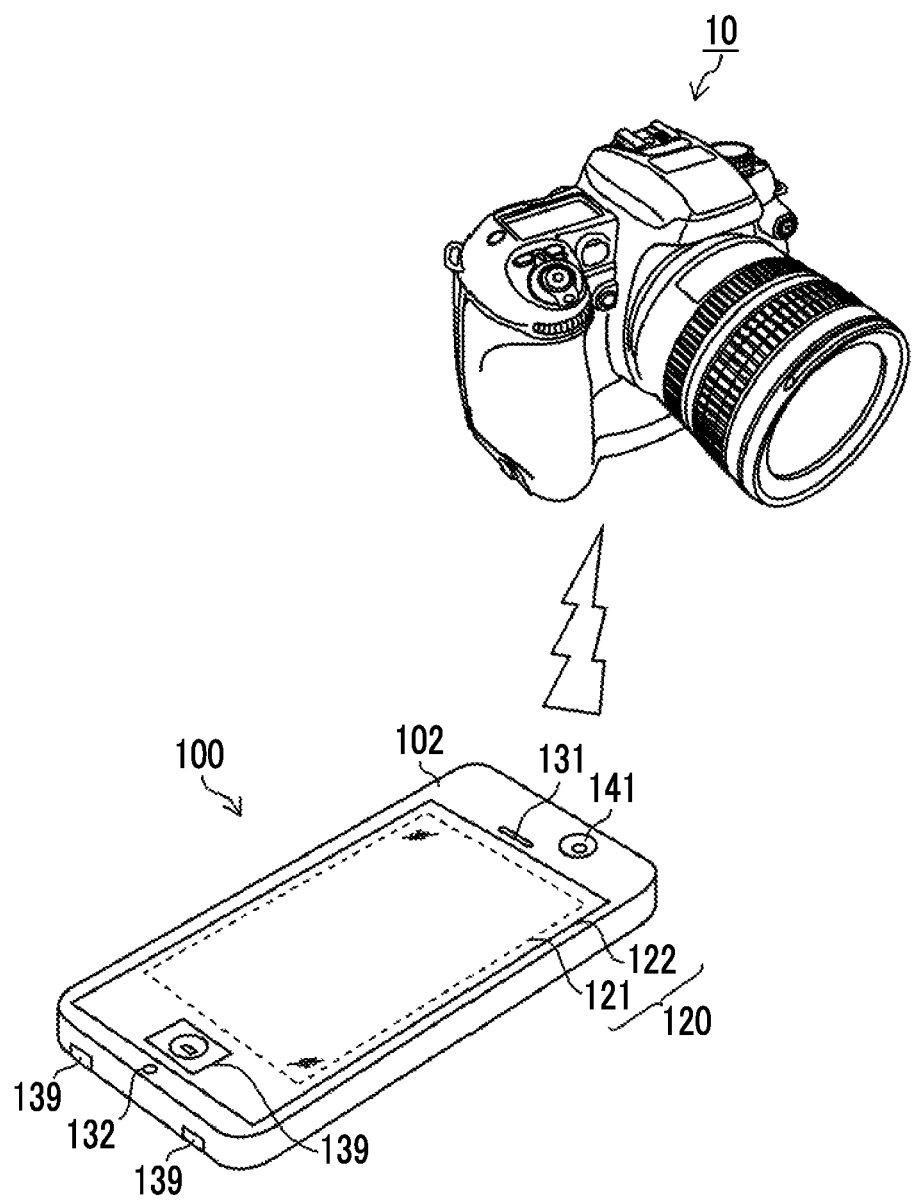
FIG. 1 is a perspective view illustrating appearances of a multi-imaging apparatus and an external imaging device.

FIG. 1 is a perspective view illustrating appearances of a multi-imaging apparatus 100 (hereinafter, referred to as a smartphone) and an external imaging device 10. Here, the smartphone 100 is connected to the external imaging device 10 in a wireless manner. The smartphone 100 acquires an image captured by the external imaging device 10 through wireless communication, and transmits an instruction for controlling the external imaging device 10. In this description, the multi-imaging apparatus refers to an imaging apparatus capable of performing a multi-view display of a first live view image and a second live view image on a display unit thereof.

The external imaging device 10 may include a camera side wireless communication unit 50 (FIG. 2) capable of performing wireless communication with the smartphone 100, and various types of imaging devices may be used as the external imaging device 10. For example, as the external imaging device 10, a digital single lens reflect camera, a mirror-less digital camera, a compact digital camera, or a smartphone may be used.

(Internal Configuration of Imaging Device)

Figure 2:
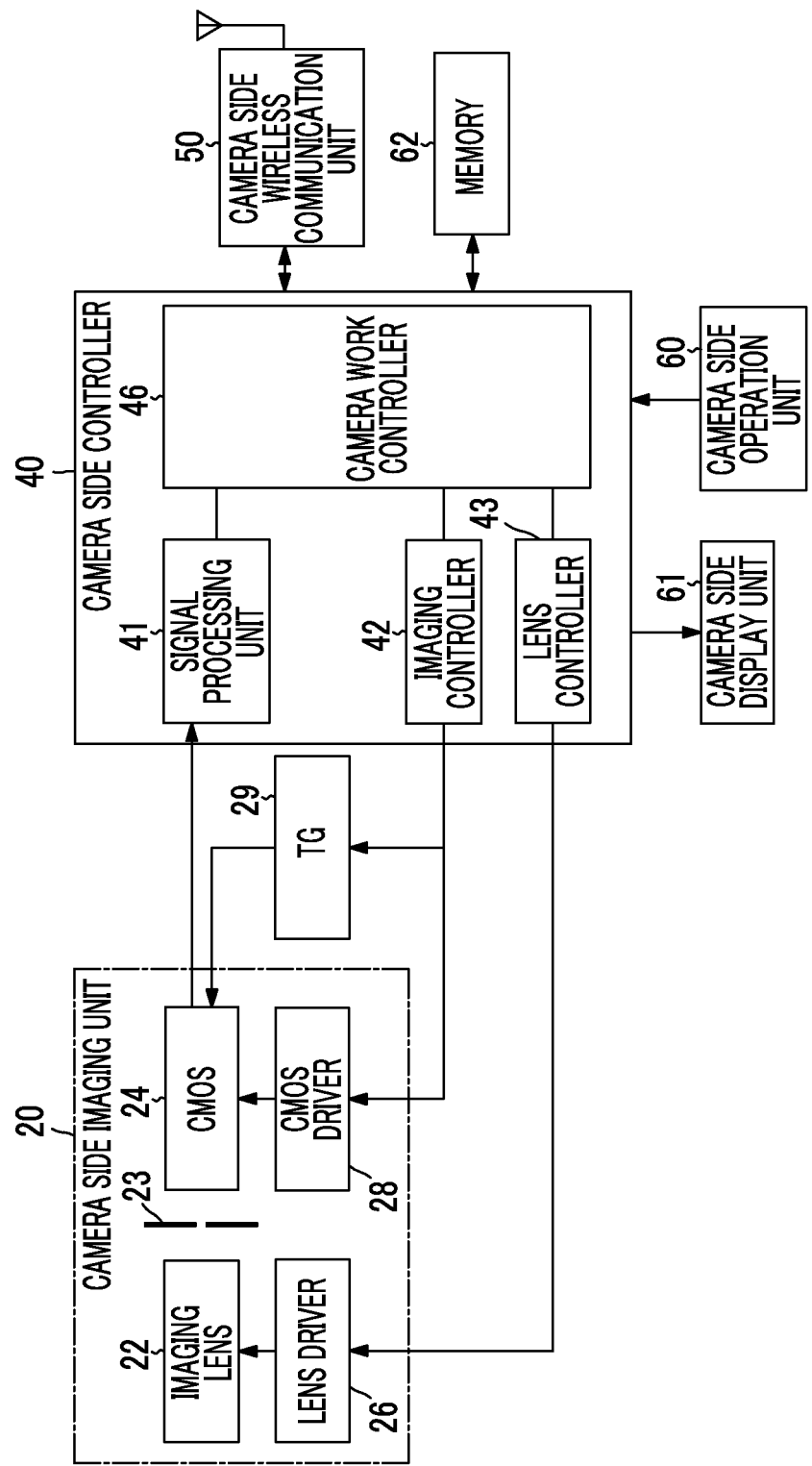
FIG. 2 is a block diagram illustrating an example of an internal configuration of an external imaging device.

FIG. 2 is a block diagram illustrating an example of an internal configuration of the external imaging device 10.

The external imaging device 10 is capable of performing capturing of a still image and a moving image, and includes a camera side imaging unit 20, a camera side controller 40, and the camera side wireless communication unit 50 as main components.

The camera side imaging unit 20 includes an imaging lens 22 and an imaging element (written as a CMOS in FIG. 2) 24, and the like. The imaging lens 22 is a single focus lens or a zoom lens, and forms a subject image on an imaging surface of the imaging element 24. A focus lens, a variable magnification lens (in the case of a zoom lens), and a diaphragm 23 included in the imaging lens 22 are driven by a lens driver 26, respectively.

In this example, the imaging element 24 is a color imaging element in which primary color filters of three primary colors of red (R), green (G) and blue (B) are disposed in a predetermined pattern (Bayer array, G-striped RIB full checker, X-Trans (registered trademark) array, or honeycomb arrangement), and is configured by a complementary metal oxide semiconductor (CMOS) imaging sensor. The imaging element 24 is not limited to the CMOS imaging sensor, and may be a charge coupled device (CCD) imaging sensor.

The imaging element 24 is driven by a CMOS driver 28 that includes a vertical driver, a horizontal driver, and the like, and a timing generator (written as TG in FIG. 2) 29. A pixel signal (a digital signal corresponding to signal charges accumulated for each pixel) according to the intensity of incident subject light is read from the imaging element 24.

The camera side controller 40 includes a signal processing unit 41, an imaging controller 42, a lens controller 43, and a camera work controller 46 as main components.

The signal processing unit 41 performs signal processing such as offset processing, gain control processing including white balance correction and sensitivity correction, gamma correction processing, demosaic processing (demosaicing), and RGB/YC conversion processing, with respect to a digital image signal input from the camera side imaging unit 20. Here, the demosaic processing is a process of calculating all color information for each pixel from a mosaic image corresponding to a color filter array of a single plate-type color imaging element, which is also referred to as a synchronization process. For example, in the case of an imaging element that includes color filters of three colors of R, G, and B, the demosaic processing is a process of calculating color information about all colors of R, G, and B for each pixel from a mosaic image formed by R, G, and B. Further, the RGB/YC conversion processing is a process of generating luminance data Y and color difference data Cb and Cr from RGB image data which is demosaic-processed.

The imaging controller 42 is a unit that gives a command for discharging charges accumulated in a capacitor of each pixel of the imaging element 24, reading of a signal corresponding to the charges accumulated in the capacitor, or the like through the CMOS driver 28 and the TG 29, and performs an imaging control.

The lens controller 43 is a unit that controls the focus lens, the variable magnification lens, and the diaphragm 23 included in the imaging lens 22 through the lens driver 26, and performs an auto focus (AF) control for moving the focus lens to a focusing position, for example. The AF control is performed by integrating absolute values of high-frequency components of digital signals corresponding to an AF area, detecting a focusing position where the integrated value (AF evaluation value) becomes a maximum, and moving the focus lens to the detected focusing position.

The camera work controller 46 outputs command signals for controlling the signal processing unit 41, the imaging controller 42, and the lens controller 43.

The camera side wireless communication unit 50 is a unit that performs wireless communication with an external terminal such as the smartphone 100 shown in FIG. 1, and receives various operation instructions from the smartphone 100 through wireless communication. Further, the camera side wireless communication unit 50 may transmit an image for recording or the like to the smartphone 100, and may also transmit an image (live view image) captured by the camera side imaging unit 20 as a moving image and processed by the signal processing unit 41 to the smartphone 100. Thus, it is possible to record an image for recording such as a moving image on an internal or external recording medium of the smartphone 100, or to display a live view image on a display panel 121 of a display input unit 120 (FIG. 1) of the smartphone 100.

The camera side operation unit 60 includes an imaging start button, a power button, and the like provided in the external imaging device 10, and is capable of performing operation instruction inputs which are the same as operation instruction inputs from the smartphone 100.

The camera side display unit 61 functions as an image display unit that displays a live view image, a reproduction image, or the like, and functions as a user interface unit (UI unit) for display of a menu screen, or for setting or input of various parameters, in cooperation with the camera side operation unit 60.

The memory 62 includes a synchronous dynamic random access memory (SDRAM) which serves as a storage area in which a still image or a moving image is temporarily stored and a work area for performing various computational operations or the like, and a read only memory (ROM) in which a program for imaging, a variety of data necessary for control, or the like is stored.

(Internal Configuration of Multi-Imaging Apparatus)

Figure 3:
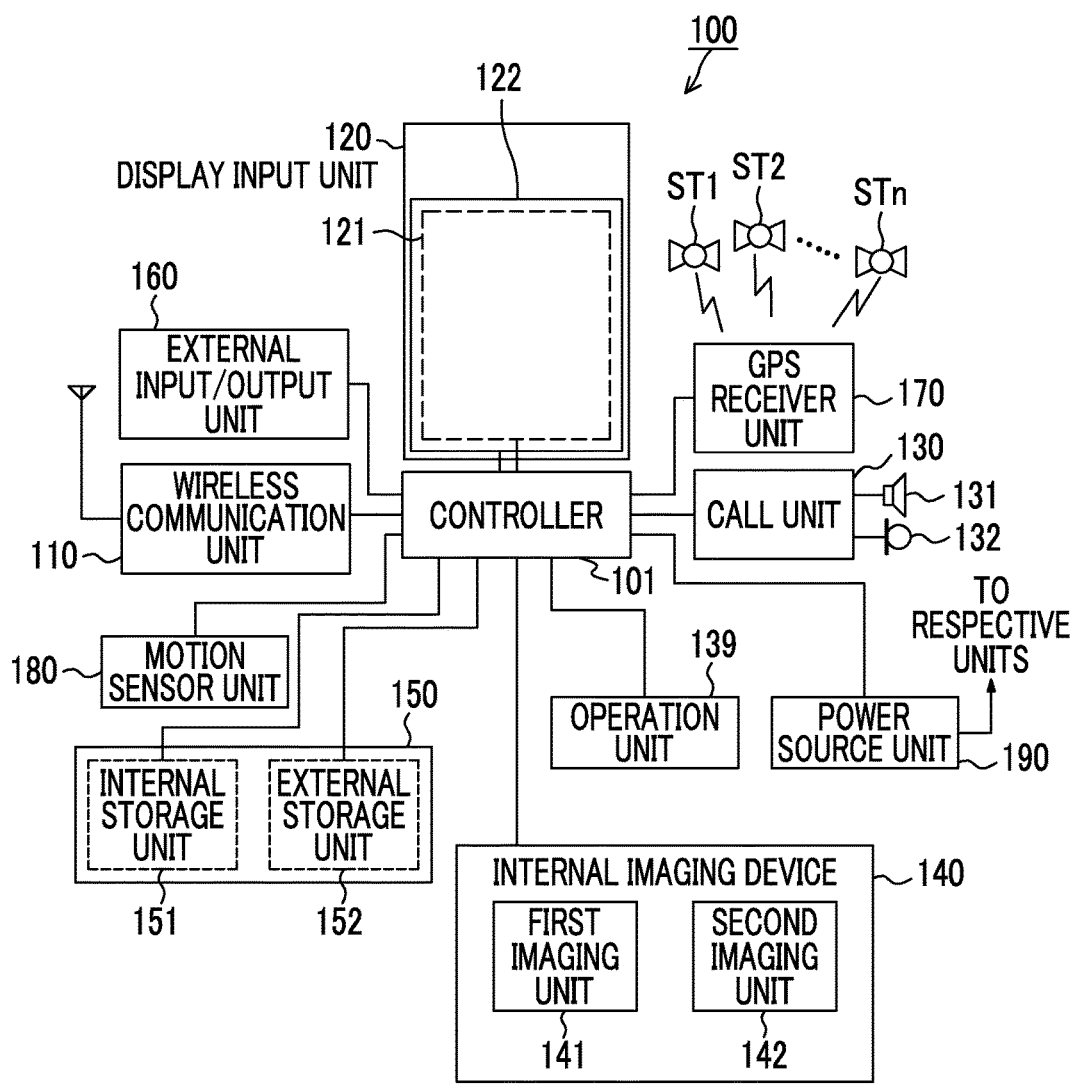
FIG. 3 is a block diagram illustrating an example of an internal configuration of a multi-imaging apparatus.

FIG. 3 is a block diagram illustrating an example of an internal configuration of the multi-imaging apparatus (smartphone) 100 shown in FIG. 1.

As shown in FIG. 3, the smartphone 100 includes, as main components, a wireless communication unit 110, the display input unit 120, a call unit 130, an operation unit 139, an internal imaging device 140, a storage unit 150, an external input/output unit 160, a global positioning system (GPS) receiver unit 170, a motion sensor unit 180, a power source unit 190, and a controller 101. Further, the smartphone 100 has a wireless communication function for performing mobile wireless communication with a base station apparatus BS through a mobile communication network NW as a main function.

The wireless communication unit 110 performs wireless communication with the base station apparatus BS included in the mobile communication network NW according to an instruction of the controller 101. Using the wireless communication, the wireless communication unit 110 performs transmission and reception of a variety of file data such as sound data or image data, electronic mail data, or the like, and performs reception of Web data, streaming data, or the like. In this example, the wireless communication unit 110 of the smartphone 100 transmits various operation instructions to the external imaging device 10, or receives a live view image, an image captured by a main imaging operation, or the like from the external imaging device 10. The wireless communication unit 110 is capable of performing wireless communication with a plurality of external imaging devices 10, but if the number of external imaging devices 10 to be connected becomes large, a communication traffic for wireless communication with each external imaging device 10 may be reduced.

The display input unit 120 displays an image (a still image and a moving image), character information, or the like under the control of the controller 101 to visually transmit the information to a user, and detects a user operation with respect to the displayed information. The display input unit (display unit) 120 includes the display panel 121 and an operation panel 122. When viewing a 3D image, it is preferable that the display panel 121 is a 3D display panel.

The display panel 121 uses a liquid crystal display (LCD), an organic electro-luminescence display (OELD), or the like as a display device.

The operation panel 122 is a device that is disposed so that an image displayed on a display surface of the display panel 121 can be visually recognized thereon and detects one or a plurality of sets of coordinates operated by a user's finger or a stylus pen. If this device is operated by a user's finger or a stylus pen, the operation panel 122 outputs a detection signal generated due to the operation to the controller 101. Then, the controller 101 detects an operation position (coordinates) on the display panel 121 based on the received detection signal.

As shown in FIG. 1, a configuration in which the display panel 121 and the operation panel 122 of the smartphone 100 are integrated to form the display input unit 120 is used, in which the operation panel 122 is disposed to completely cover the display panel 121. In a case where such a configuration is employed, the operation panel 122 may have a function for detecting a user operation in a region out of the display panel 121. In other words, the operation panel 122 may include a detection region with respect to a portion that overlaps the display panel 121 (hereinafter, referred to as a "display region"), and a detection region with respect to an outer edge portion that does not overlap the display panel 121 (hereinafter, referred to as a "non-display region").

The size of the display region and the size of the display panel 121 may be completely the same, but it is not essential that both of the sizes are the same. Further, the operation panel 122 may include two sensitive regions of an outer edge portion and an inner portion other than the outer edge portion. Further, the width of the outer edge portion is appropriately designed according to the size of a housing 102, or the like. Furthermore, as a position detection method employed in the operation panel 122, any one of a matrix switch type, a resistive film type, a surface acoustic wave type, an infrared type, an electromagnetic induction type, an electrostatic capacitance type, and the like may be employed.

The call unit 130 includes a speaker 131 and a microphone 132. The call unit 130 converts user's voice input through the microphone 132 into voice data capable of being processed by the controller 101 and outputs the result to the controller 101, or decodes voice data received by the wireless communication unit 110 or the external input/output unit 160 and outputs the result through the speaker 131.

Further, as shown in FIG. 1, for example, the speaker 131 and the microphone 132 may be mounted on the same surface as the surface where the display input unit 120 is provided.

The operation unit 139 may be a hardware key using a key switch or the like, or may be a switch displayed on the display input unit 120. The operation unit 139 receives an instruction from a user. For example, the operation unit 139 may instruct a main imaging operation of the external imaging device 10 through the controller 101. For example, the operation unit 139 is a push button switch that is mounted on a lower side of the display input unit 120 in the housing 102 of the smartphone 100, or on a lower side surface of the housing 102, is turned on when being pressed by a finger or the like, and is turned off by a restoring force of a spring or the like when the finger is separated.

The storage unit 150 stores a control program or control data of the controller 101, address data in which a name, a telephone number, and the like of a communication partner are associated with each other, data on transmitted or received e-mails, Web data downloaded by a Web browser, or data on downloaded content, and temporarily stores streaming data or the like. Further, the storage unit 150 includes an internal storage unit 151 provided in the smartphone, and an external storage unit 152 provided with a slot for detachable external memory. Each of the internal storage unit 151 and the external storage unit 152 that form the storage unit 150 is realized using a storage medium such as a flash memory, a hard disk, a multimedia card micro type memory, a card type memory (for example, MicroSD (registered trademark) memory or the like), a random access memory (RAM), a read only memory (ROM), or the like.

Further, a first image and a second image which are composed in the same form as that of live view images displayed on the display input unit 120 of the smartphone 100 as a multi-live view are stored in the storage unit 150. Further, a first image captured by a main imaging operation of the internal imaging device 140 and a second image captured by a main imaging operation of the external imaging device 10 may be stored in the storage unit 150.

The external input/output unit 160 serves as an interface with respect to all types of external devices to be connected to the smartphone 100, and is directly or indirectly connected to other external devices through communication or the like (for example, Universal Serial Bus (USB), IEEE1394, or the like) or a network (for example, Internet, wireless LAN, Bluetooth (registered trademark), Radio Frequency Identification (RFID), Infrared Data Association (IrDA, registered trademark), Ultra Wideband (UWB, registered trademark), ZigBee (registered trademark), or the like).

As an external device to be connected to the smartphone 100, for example, a wired or wireless headset, a wired or wireless external charger, a wired or wireless data port, a memory card, a subscriber identity module (SIM) card or a user identity module (UIM) card connected through a card socket, an external audio/video device connected through an audio/video input/output (I/O) terminal, an external audio/video device connected in a wireless manner, a smartphone connected in a wired or wireless manner, a personal computer connected in a wired or wireless manner, a PDA connected in a wired or wireless manner, an earphone, or the like, may be used. The external input/output unit 160 may be configured to transmit received data transmitted from such an external device to respective components in the smartphone 100, or to transmit data in the smartphone 100 to the external device.

The GPS receiver unit 170 receives GPS signals transmitted from GPS satellites ST1 to STn according to an instruction of the controller 101, executes a positioning operation process based on the plurality of received GPS signals, and detects a position specified by the latitude, longitude and altitude of the smartphone 100. In a case where position information can be acquired from the wireless communication unit 110 or the external input/output unit 160 (for example, wireless LAN), the GPS receiver unit 170 can also detect the position using the position information.

The motion sensor unit 180 includes a triaxial acceleration sensor or the like, for example, and detects a physical movement of the smartphone 100 according to an instruction of the controller 101. By detecting the physical movement of the smartphone 100, a direction and an acceleration where the smartphone 100 moves are detected. The detection result is output to the controller 101. Further, a posture of the smartphone 100 and directions of optical axes of a first imaging unit and a second imaging unit of the smartphone 100 are detected by the motion sensor unit 180.

The power source unit 190 supplies power accumulated in a battery (not shown) to respective units of the smartphone 100 according to an instruction of the controller 101.

The controller 101 includes a microprocessor, and is operated according to a control program or control data stored in the storage unit 150 to generally control the respective units of the smartphone 100. Further, the controller 101 has a mobile communication control function for controlling respective units of a communication system and an application processing function in order to perform voice communication or data communication through the wireless communication unit 110.

The application processing function is realized as the controller 101 is operated according to application software stored in the storage unit 150. As the application processing function, for example, an infrared communication function for controlling the external input/output unit 160 to perform data communication with an opposing device, an e-mail function for performing transmission and reception of e-mails, a Web browsing function for browsing Web pages, or the like is used.

Further, the controller 101 has an image processing function, for example, for displaying video on the display input unit 120 based on image data (data on a still image or a moving image) such as received data or downloaded streaming data. The image processing function refers to a function for decoding image data, performing image processing with respect to the decoded image data, and displaying an image obtained through the image processing on the display input unit 120, by the controller 101. For example, the controller 101 receives an input of a first live view image from the internal imaging device 140, receives a second live view image from the external imaging device 10 through the wireless communication unit 110, and causes the display input unit 120 to display the input first live view image and the received second live view image as a multi-live view.

In addition, the controller 101 executes a display control with respect to the display panel 121, and an operation detection control for detecting a user operation through the operation unit 139 or the operation panel 122.

By execution of the display control, the controller 101 displays an icon for starting up application software or a software key such as a scroll bar, or displays a window for creating an e-mail. The scroll bar refers to a software key for receiving, with respect to a large image which is not accommodated in a display region of the display panel 121, an instruction for movement of a display portion of the image.

Further, the controller 101 executes an operation detection control for detecting a user operation through the operation unit 139 or the operation panel 122.

Further, by execution of the operation detection control, the controller 101 detects a user operation through the operation unit 139, receives an operation with respect to the icon or an input of a character string with respect to an input section of the window, through the operation panel 122, or receives a scroll request of a display image through the scroll bar. For example, if a main imaging instruction is given through the operation unit 139, the controller 101 transmits an imaging instruction for instructing a main imaging operation of the external imaging device 10 to the external imaging device 10 through the wireless communication unit 110. Further, if a main imaging instruction is given through the operation unit 139, the controller 101 outputs an imaging instruction for instructing a main imaging operation of the internal imaging device 140 to the internal imaging device 140 in synchronization with the transmission of the main imaging instruction to the external imaging device 10, to thereby make it possible to perform the main imaging operations of the internal imaging device 140 and the external imaging device 10 at the same time.

Furthermore, by execution of the operation detection control, the controller 101 includes a touch panel control function for determining whether an operation position with respect to the operation panel 122 corresponds to a portion (display region) that overlaps the display panel 121 or an outer edge portion (non-display region) that does not overlap the display panel 121, and controlling a sensitive region of the operation panel 122 and a display position of a software key.

The controller 101 may detect a gesture operation with respect to the operation panel 122, and may execute a predetermined function according to the detected gesture operation. The gesture operation does not refer to a typical simple operation, but refers to an operation of drawing a locus using a finger or the like, an operation of simultaneously designating a plurality of positions, or an operation of drawing a locus with respect to at least one of a plurality of positions by combination of the above operations.

The internal imaging device 140 is a digital camera that performs electronic photographing (imaging) using an imaging element such as a complementary metal oxide semiconductor (CMOS) or a charge-coupled device (CCD). Further, the internal imaging device 140 includes a first imaging unit 141 and a second imaging unit 142. The number of imaging units included in the internal imaging device 140 is not particularly limited. Here, each of the first imaging unit 141 and the second imaging unit 142 is an imaging unit that includes at least an imaging lens or an imaging element.

Further, the internal imaging device 140 may convert image data obtained through imaging into compressed image data such as a joint photographic coding experts group (JPEG), for example, may record the image data in the storage unit 150, or may output the image data through the external input/output unit 160 or the wireless communication unit 110, under the control of the controller 101.

In the smartphone 100 shown in FIG. 1, the first imaging unit 141 of the internal imaging device 140 is mounted on the same surface as that of the display input unit 120. Further, the second imaging unit 142 of the internal imaging device 140 is mounted on a rear surface of the display input unit 120. In FIG. 1, the second imaging unit 142 of the internal imaging device 140 mounted on the rear surface of the display input unit 120 is not shown. In a case where a plurality of internal imaging devices 140 is mounted, imaging may be performed using a single internal imaging device 140 while performing switching between the plurality of internal imaging devices 140 to be provided for imaging, or may be performed using the plurality of internal imaging devices at the same time. Thus, the controller 101 may acquire a first live view image or a first image from both or one of the first imaging unit 141 and the second imaging unit 142.

Further, the internal imaging device 140 may be used for various functions of the smartphone 100. For example, a live view image (first live view image) acquired by the internal imaging device 140 or an image (first image) captured by a main imaging operation thereof may be displayed on the display panel 121, or an image in the internal imaging device 140 may be used as one of operation inputs through the operation panel 122. Further, when the GPS receiver unit 170 detects a position, the position may be detected with reference to an image from the internal imaging device 140. In addition, it is possible to determine an optical axis direction or a current usage environment of the internal imaging device 140 of the smartphone 100 without using a triaxial acceleration sensor or by using the triaxial acceleration sensor together, with reference to an image from the internal imaging device 140. Furthermore, an image from the internal imaging device 140 may be used in the application software.

In this example, the application software for operating the external imaging device 10 is downloaded through the network and is stored in the storage unit 150, and the controller 101 is operated according to the downloaded application software using the application processing function of the smartphone 100. Thus, the general-purpose smartphone 100 functions as a user interface (UI unit) for operating the external imaging device 10.

(Display Screen of Smartphone)

Figure 4:
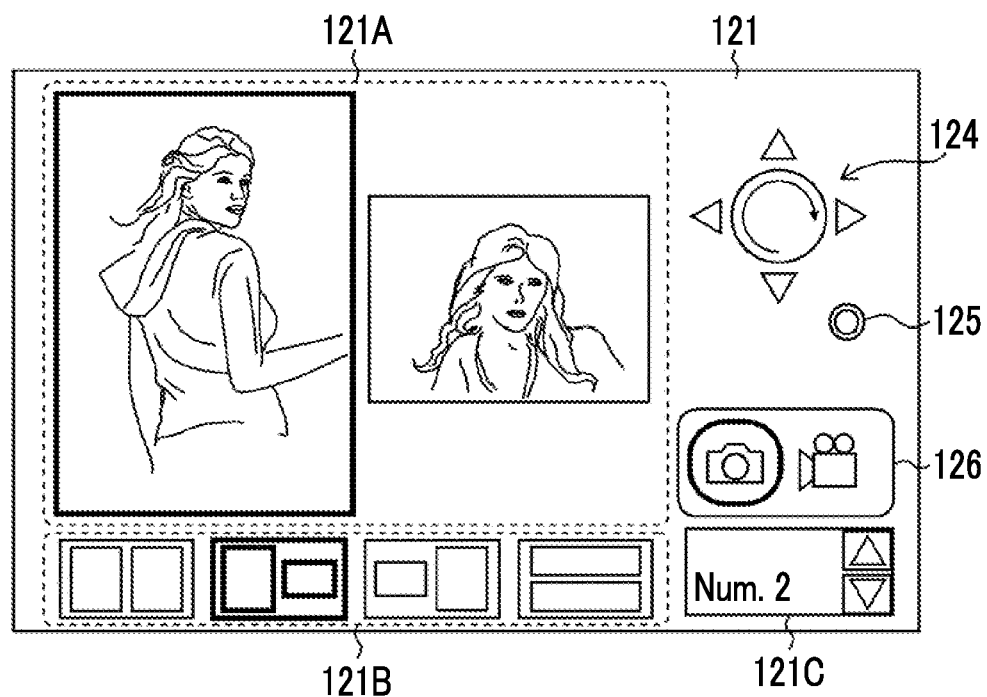
FIG. 4 is a diagram illustrating a display example on a display screen of a multi-imaging apparatus.

FIG. 4 is a diagram illustrating a display example on the display panel 121 of the display input unit 120 of the multi-imaging apparatus (smartphone) 100.

The smartphone 100 includes the display input unit 120 provided with the display panel 121 and the operation panel 122 (see FIG. 3), in which a panel surface of the display panel 121 serves as a display screen.

As shown in FIG. 4, a display region 121A where live view images are displayed, a display region 121B where icon buttons indicating layouts of live view images are displayed, and a display region 121C where a dialogue box including an up/down control for setting the number of a plurality of cameras for capturing live view images is displayed are provided in the display panel 121. Further, a multi-functional cross key 124 that includes icons indicating upper, lower, left and right directional keys and a center key, an imaging start button (icon button) 125 for instructing the start of imaging, and a select button (icon button) 126 for selecting imaging of a still image or a moving image are displayed in the display panel 121.

The controller 101 causes a first live view image acquired from the internal imaging device 140 or a first image captured by a main imaging operation thereof, and a second live view image acquired through wireless communication from the external imaging device 10 or a second image captured by a main imaging operation thereof to be displayed in the display region 121A of the display panel 121 of the display input unit 120.

Here, the controller 101 causes a live view image to be displayed in the display region 121A of the display panel 121 according to a layout selected by any one of icon buttons indicating layouts, displayed in the display region 121B. In the example shown in FIG. 4, since the second icon button (an icon button indicated by a thick frame) from the left in FIG. 4 among icon buttons indicating four layouts is operated and a layout indicated by the second icon button from the left is selected, the controller 101 causes two live view images to be displayed in the display region 121A of the display panel 121 according to the layout indicated by the second icon button from the left.

By increasing or decreasing a numeral in the dialogue box displayed in the display region 121C of the display panel 121 through the up/down control, it is possible to select the number of cameras used for imaging. Further, icon buttons indicating layouts displayed in the display region 121B also change according to the number of selected cameras. Details about the number of cameras and layouts of images corresponding to the number of cameras will be described later.

If any one live view image among live view images displayed in the display region 121A of the display panel 121 is touch-operated, a frame of the touch-operated live view image is highlighted (displayed by a thick frame), to thereby make it possible to individually operate, by remote control, a camera that transmits the live view image displayed by the thick frame.

The imaging start button 125 is one form of the operation unit 139. The operation unit 139 may be a button which is hardware of the smartphone 100 as shown in FIG. 1, but may employ the imaging start button 125 displayed on a display screen as shown in FIG. 4.

In addition, the controller 101 generates and acquires a multi-view image obtained by composing a first image captured by a main imaging operation of the internal imaging device 140 and a second image captured by a main imaging operation of the external imaging device 10 according a set layout and set image positions. Further, the controller 101 stores the generated and acquired multi-view image in the storage unit 150.

Next, the types of layouts according to the number of cameras will be described.

Figure 5:
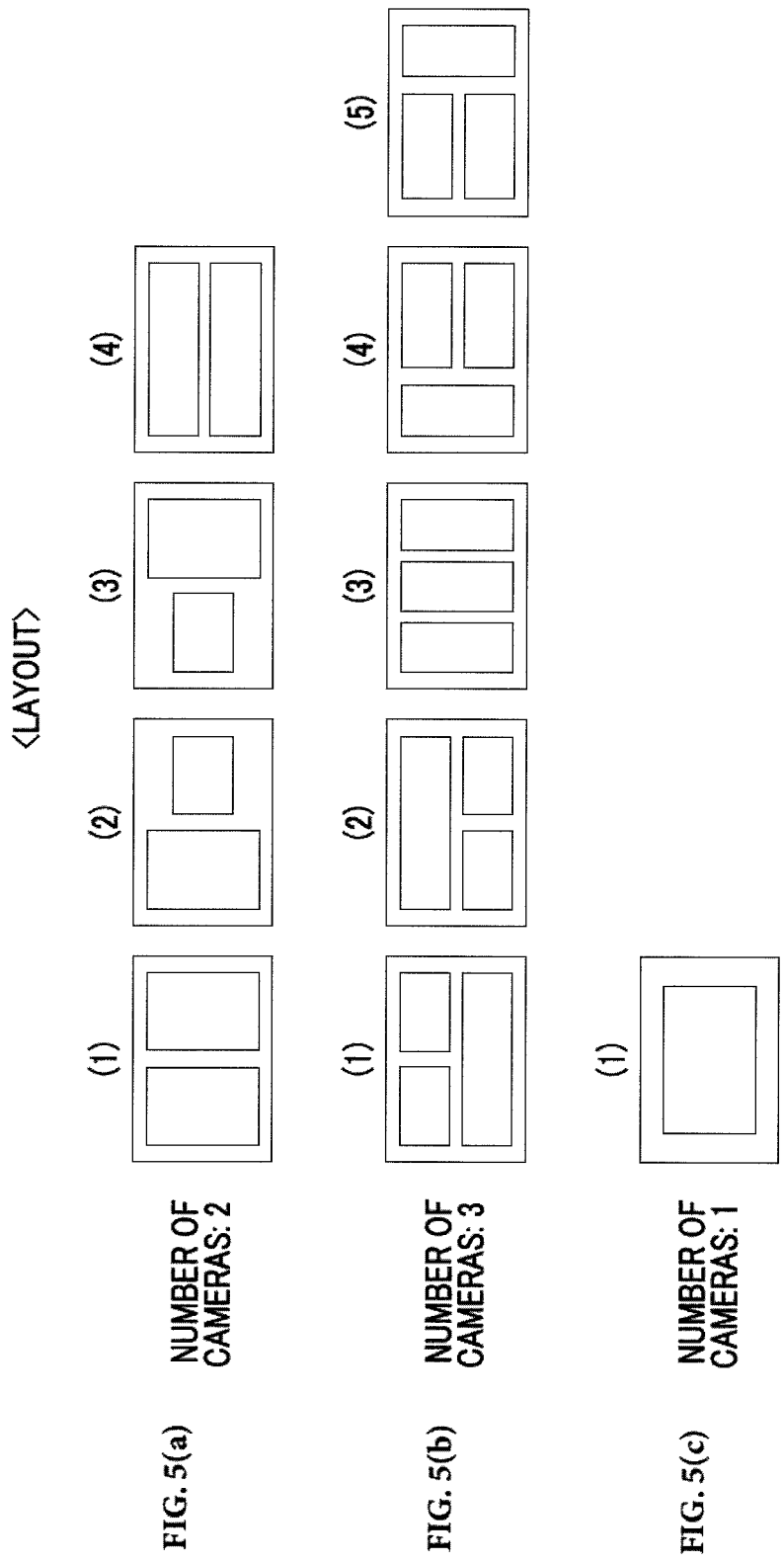
FIGS. 5(a), 5(b), and 5(c) show conceptual diagrams illustrating layouts of display screens of a multi-imaging apparatus.

FIGS. 5(*a*) to 5(*c*) show diagrams illustrating layouts capable of being respectively selected in a case where the number of cameras is 3, 2, and 1.

In a case where the number of cameras is 2 as shown in FIG. 5(*a*), one layout may be selected from four layouts (1) to (4). Layout buttons displayed in the display region 121B of the display panel 121 in FIG. 4 represent four layouts (1) to (4) shown in FIG. 5(*a*), and relate to a case where Layout (2) is selected.

Layout (1) among four layouts shown in FIG. 5(*a*) represents a layout in which two image which are respectively longitudinally trimmed are disposed in a transverse direction. Layout (2) represents a layout in which one image which is longitudinally trimmed is disposed at a left-side image position of the display region 121B and one image which is not trimmed is disposed at a right-side image position of the display region 121B, and Layout (3) represents a layout in which left and right image positions are reversed, compared with Layout (2). Layout (4) represents a layout in which two images which are respectively transversely trimmed are disposed in a longitudinal direction.

In a case where the number of cameras is 3 as shown in FIG. 5(*b*), one layout may be selected from five layouts (1) to (5).

Layout (1) among five layouts shown in FIG. 5(*b*) represents a layout in which up and down image positions are reversed, compared with Layout (2), and Layout (3) represents a layout in which three images which are respectively longitudinally trimmed are disposed in a transverse direction. Layout (4) represents a layout in which one image which is longitudinally trimmed is disposed at a left-side image position of the display region 121B and two images which are transversely trimmed are disposed at right-side up and down image positions of the display region 121B. Layout (5) represents a layout in which left and right image positions are reversed, compared with Layout (4).

In a case where the number of cameras is 1 as shown in FIG. 5(*c*), only one Layout (1) for displaying the entirety of one image is selected (automatically set).

In this way, if the number of cameras is specified and a numeral (layout information) indicating a layout is specified, it is possible to specify a layout of one or a plurality of images. Here, a numeral indicating a layout is not limited to the number of cameras, and may be set from consecutive numbers. Thus, it is possible to specify a layout of one or a plurality of images from a numeral indicating a layout.

Further, the first image captured by the main imaging operation and the second image captured by the main imaging operation are composed in the same form as that of live view images displayed in the form of the above-described layouts and are stored in the storage unit 150. Since a specific composition method employs a known method, description thereof will not be made.

Next, a method for setting image positions of one or a plurality of live view images displayed in a selected layout will be described.

Figure 7A:
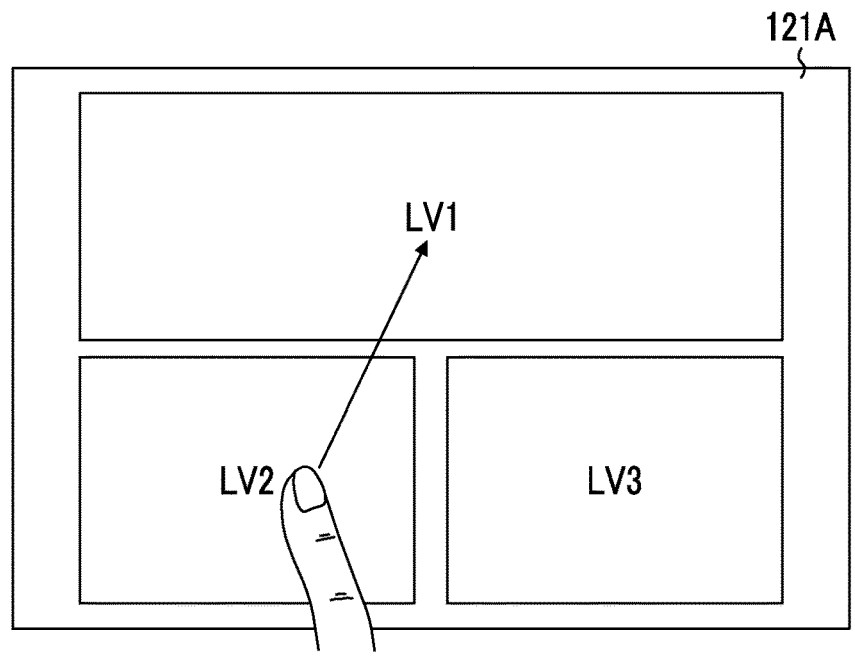
FIGS. 7A and 7B are diagrams illustrating cases where three live view images are displayed.
Figure 7B:
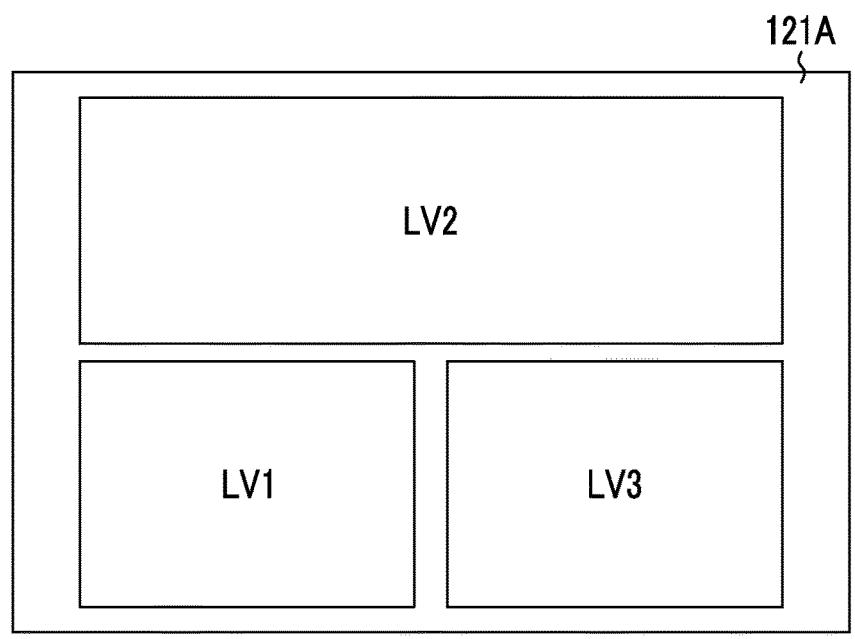

FIGS. 7A and 7B are enlarged views in a case where three live view images are displayed in the display region 121A of the display panel 121.

As shown in FIG. 7A, three live view images LV1, LV2, and LV3 are displayed in the display region 121A of the display panel 121 according to a selected layout (in this example, Layout (2) shown in FIG. 5(*b*)).

Here, it is assumed that the live view image LV1 is acquired from the internal imaging device 140 and the live view images LV2 and LV3 are received from the external imaging device 10.

An image of the live view image LV1 among respective images of the live view images LV1, LV2, and LV3 displayed according to the layout is an image subjected to trimming for cutting upper and lower regions of one captured image and having a transversely long aspect ratio, which is displayed in an upper half region (image position) of the display region 121A.

Further, images of the live view images LV2 and LV3 which are not respectively trimmed are displayed in left and right regions (image positions) of a lower half of the display region 121A.

A trimming process of cutting an image having a transversely long or longitudinally long aspect ratio from one image of a live view image is generally performed to cut a central portion of one image, but an image trimmed at an arbitrary position may be cut from the entirety of one image by displaying a trimming frame having a transversely long or longitudinally long aspect ratio in a state where the entirety of one image is displayed and by touching and moving the trimming frame.

In FIG. 7A, when performing switching between image positions of the live view images LV1 and LV2 in the layout, a swipe operation of touching the live view image LV2 and moving the live view image LV2 to the image position of the live view image LV1 is performed. Through the swipe operation, as shown in FIG. 7B, it is possible to perform switching between the image positions of the live view images LV1 and LV2.

According to the above-described movement of the image positions, the live view image LV1 becomes an image which is not trimmed, and the live view image LV2 becomes an image which is transversely trimmed. Further, by performing a swipe operation of touching the live view image LV1 and moving the live view image LV1 to the image position of the live view image LV2, it is possible to perform switching between the image positions of the live view images LV1 and LV2 as described above.

The number of combinations of image positions obtained in a case where image positions of three images of the live view images LV1 to LV3 are switched in the layout is six as shown in FIG. 6. Hereinafter, it is assumed that any one combination among the six combinations is specified by numbers of image positions (1) to (6).

In a case where the number of cameras is 3, no matter which layout is selected, there are six combinations of image positions of three images. In a case where the number of cameras is 2, the number of combinations of image positions obtained in a case where image positions of two images are switched is two. In a case where the number of cameras is 1, there is one combination of image positions.

Figure 8A:
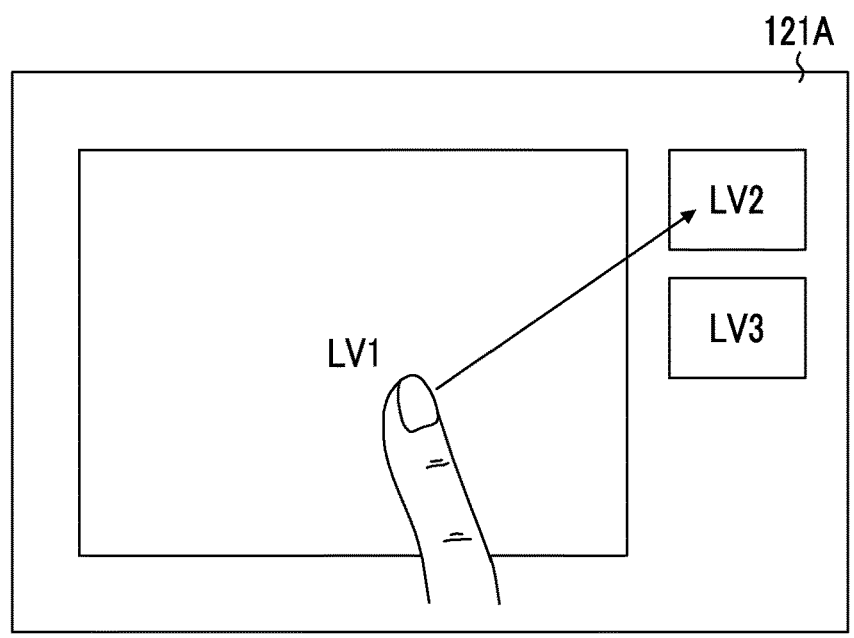
FIGS. 8A and 8B are diagrams illustrating switching between live view images.
Figure 8B:
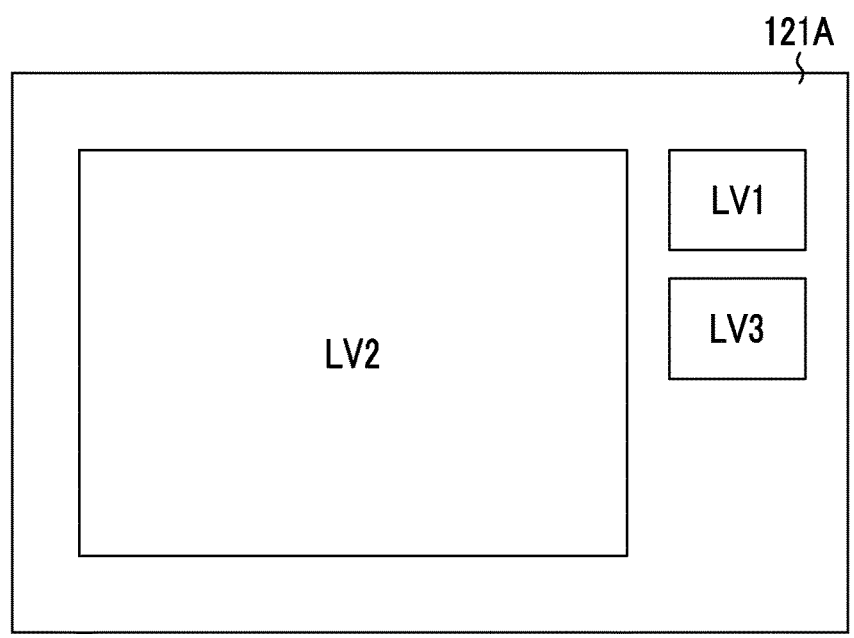

FIGS. 8A and 8B are enlarged views illustrating the display region 121A of the display panel 121, and particularly show a case where the number of selected cameras is 1 (one live view image).

In the example shown in FIG. 8A, a live view image LV1 corresponding to a selected camera is displayed on a large screen, and two live view images LV2 and LV3 corresponding to cameras which are in a communication state but are not selected are displayed on small screens. Moving images corresponding to the live view images LV2 and LV3 displayed on the small screens do not become moving image editing targets.

In FIG. 8A, when switching the selected live view image LV1 to the live view image LV2 (in a case where the live view image LV2 is selected), a swipe operation of touching the live view image LV1 and moving the live view image LV1 to an image position of the live view image LV2 is performed. Through the swipe operation, as shown in FIG. 8B, it is possible to switch the selected live view image LV1 to the live view image LV2.

By performing a swipe operation of touching the live view image LV2 and moving the live view image LV2 to an image position of the live view image LV1, it is possible to perform switching between the image positions of the live view images LV1 and LV2 (live view image selection) as described above.

In this way, if the number of cameras and a layout are specified and a combination of image positions (a number indicating the image positions) is specified, it is possible to specify which image position of the layout an image of a live view image captured by a certain camera is to be disposed at (which camera a live view image is captured by in a case where the number of cameras is 1).

(First Imaging Unit and Second Imaging Unit)

Figure 9:
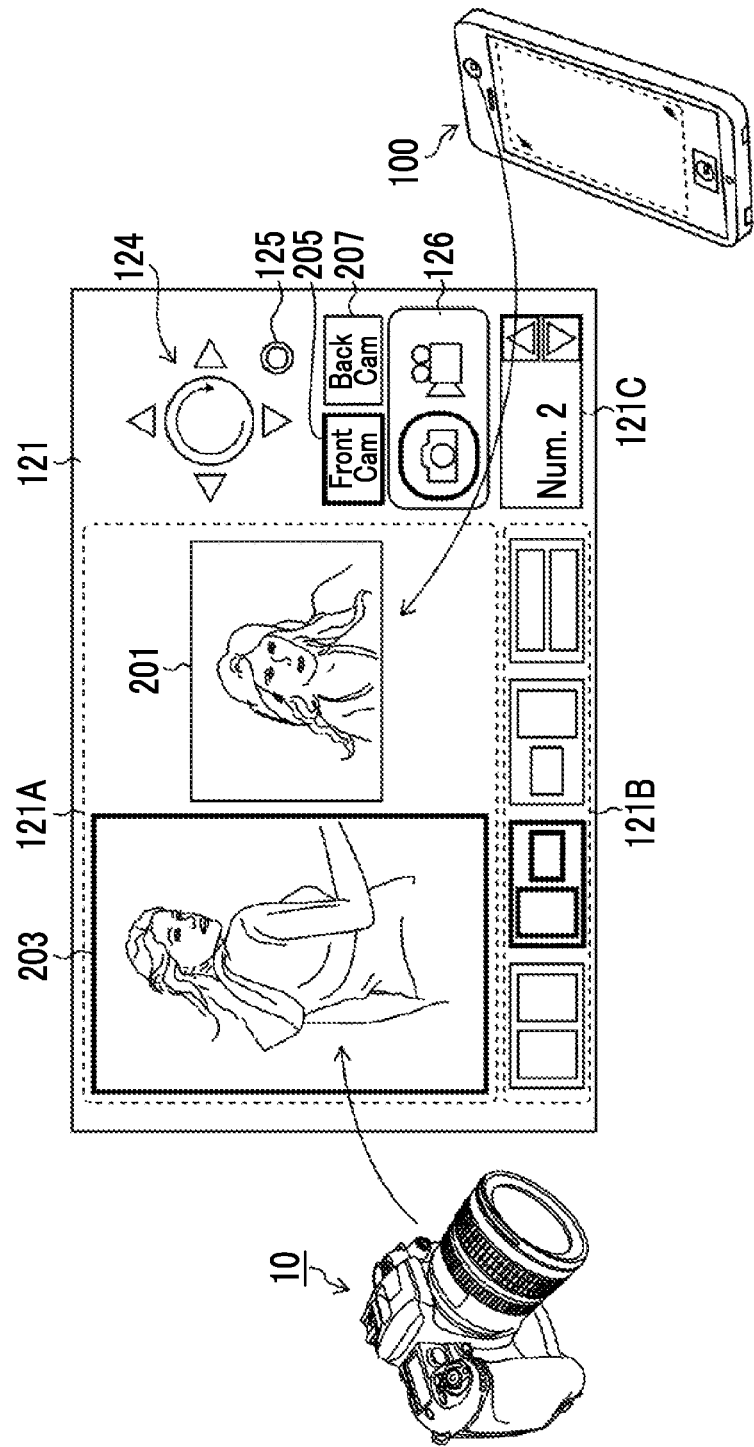
FIG. 9 is a diagram illustrating a live view image captured by a first imaging unit.
Figure 10:
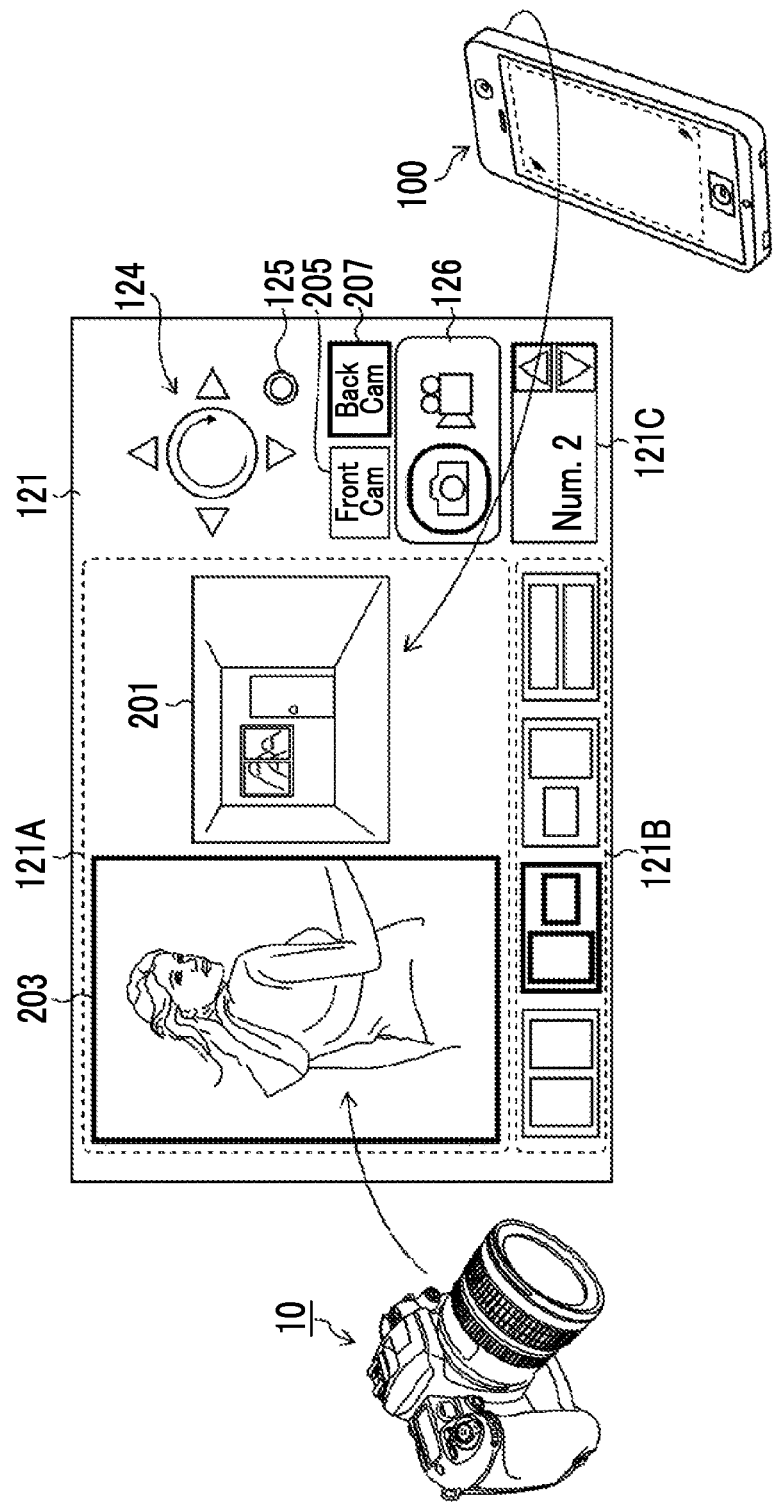
FIG. 10 is a diagram illustrating a live view image captured by a second imaging unit.

FIG. 9 and FIG. 10 are conceptual diagrams illustrating a live view image captured by the first imaging unit 141 and a live view image captured by the second imaging unit 142. In FIG. 9, a multi-live view including a first live view image 201 acquired by the internal imaging device 140 (the first imaging unit 141) of the smartphone 100 and a second live view image 203 acquired by the external imaging device 10 is displayed on the display input unit 120. In the case shown in FIG. 9, the live view image 201 in which the face of a figure is a main subject, acquired by the first imaging unit 141 (may be referred to as a front camera) provided on the side of the display input unit 120 of the smartphone 100, is displayed on the display input unit 120.

Further, a front camera instruction reception unit 205 that receives an instruction for switching to a front camera and a back camera instruction reception unit 207 that receives an instruction for switching to a back camera are provided on the display input unit 120. A user may control imaging in the back camera and imaging in the front camera using the front camera instruction reception unit 205 and the back camera instruction reception unit 207.

In FIG. 10, a multi-live view display of a first live view image acquired by the internal imaging device 140 (the second imaging unit 142) of the smartphone 100 and a second live view image acquired by the external imaging device 10 is shown. In the case shown in FIG. 10, since imaging is performed by the back camera (the second imaging unit 142) of the smartphone 100, the first live view image 201 in which a main subject different from that shown in FIG. 9 is captured is displayed.

In this way, it is possible to control the display of live view images of the first imaging unit 141 and the second imaging unit 142 in the internal imaging device 140 using the front camera instruction reception unit 205 and the back camera instruction reception unit 207 provided on the display input unit 120. Thus, it is possible to acquire images having different viewpoints in the internal imaging device 140, and to perform various types of multi-live view displays in the multi-imaging apparatus 100.

Figure 11:
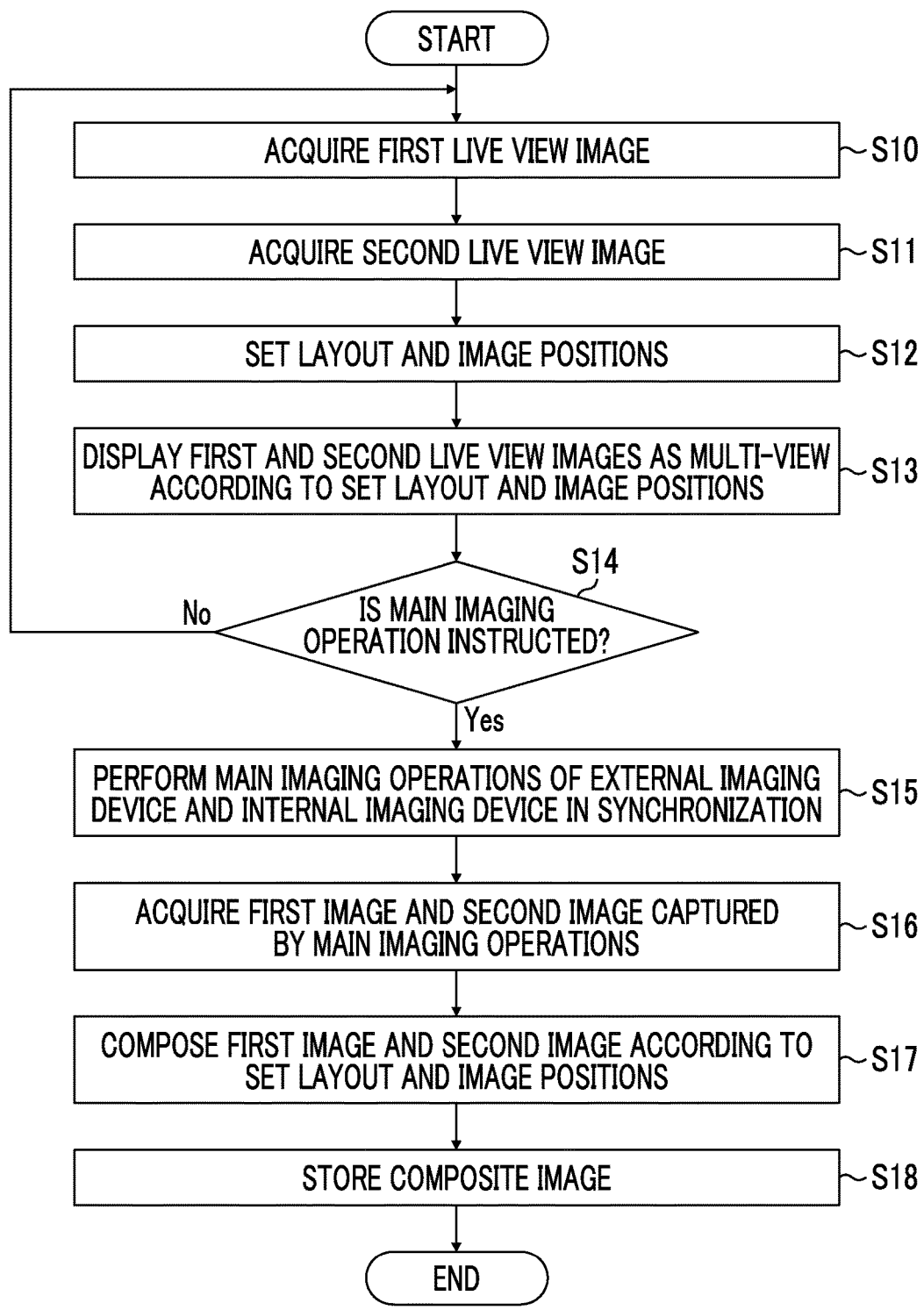
FIG. 11 is a flowchart illustrating an operation of a multi-imaging apparatus.

FIG. 11 is a flowchart illustrating an operation of the multi-imaging apparatus 100.

First, a first live view image is acquired by the first imaging unit 141 or the second imaging unit 142 of the internal imaging device 140 (step S10: internal imaging step). Then, the first live view image is output from the internal imaging device 140 to the controller 101 of the multi-imaging apparatus 100. Further, a second live view image acquired by the external imaging device 10 is acquired into the multi-imaging apparatus 100 (step S11: external imaging step). That is, the multi-imaging apparatus 100 receives the second live view image from the external imaging device 10 through the wireless communication unit 110. Then, a layout or display positions of the live view images are set by the controller 101 (step S12). The setting of the layout of the display positions of the live view images, performed by the controller 101, may be performed by the controller 101 according to a user instruction, or may be performed by the controller 101 according to a predetermined setting. Further, the first live view image and the second live view image are displayed as a multi-view image according to the set layout or display positions (step S13: display step).

Then, it is determined by the controller 101 whether there is a main imaging instruction (step S14). In a case where there is no main imaging instruction (No in step S14), a first live view image is acquired by the internal imaging device 140 again. On the other hand, in a case where there is a main imaging instruction with respect to the external imaging device 10 and the internal imaging device 140 (Yes in step S14), the controller 101 causes the external imaging device 10 and the internal imaging device 140 to perform a main imaging operation in synchronization (step S15).

Then, the controller 101 acquires a first image and a second image captured by the main imaging operation (step S16). Further, the controller 101 composes the first image and the second image according to the set layout and display positions (step S17). Then, the controller 101 stores a multi-view display image in which the first image and the second image are composed according to the set layout and display positions in the storage unit 150 (step S18). The invention may also be realized by a program that causes a computer to execute the respective steps in the above-described flowchart. In this case, the program may be stored on a computer readable non-transitory recording medium.

As described above, according to this embodiment, since a multi-live view display is performed by live view images acquired by the internal imaging device 140 and the external imaging device 10, it is possible to effectively use the internal imaging device 140 of the multi-imaging apparatus 100, and to reduce a wireless communication traffic between the multi-imaging apparatus 100 and the external imaging device 10. For example, compared with a case where two external imaging devices 10 are connected in a wireless manner in order to acquire two live view images, in this embodiment, since only one external imaging device 10 is connected to the multi-imaging apparatus 100 through wireless communication, it is possible to reduce a wireless communication traffic corresponding to connection of one external imaging device 10.

Second Embodiment

Next, a second embodiment will be described. In this embodiment, an imaging device (pan/tilt camera) that includes a pan/tilt mechanism is used as an external imaging device 10.

Figure 12:
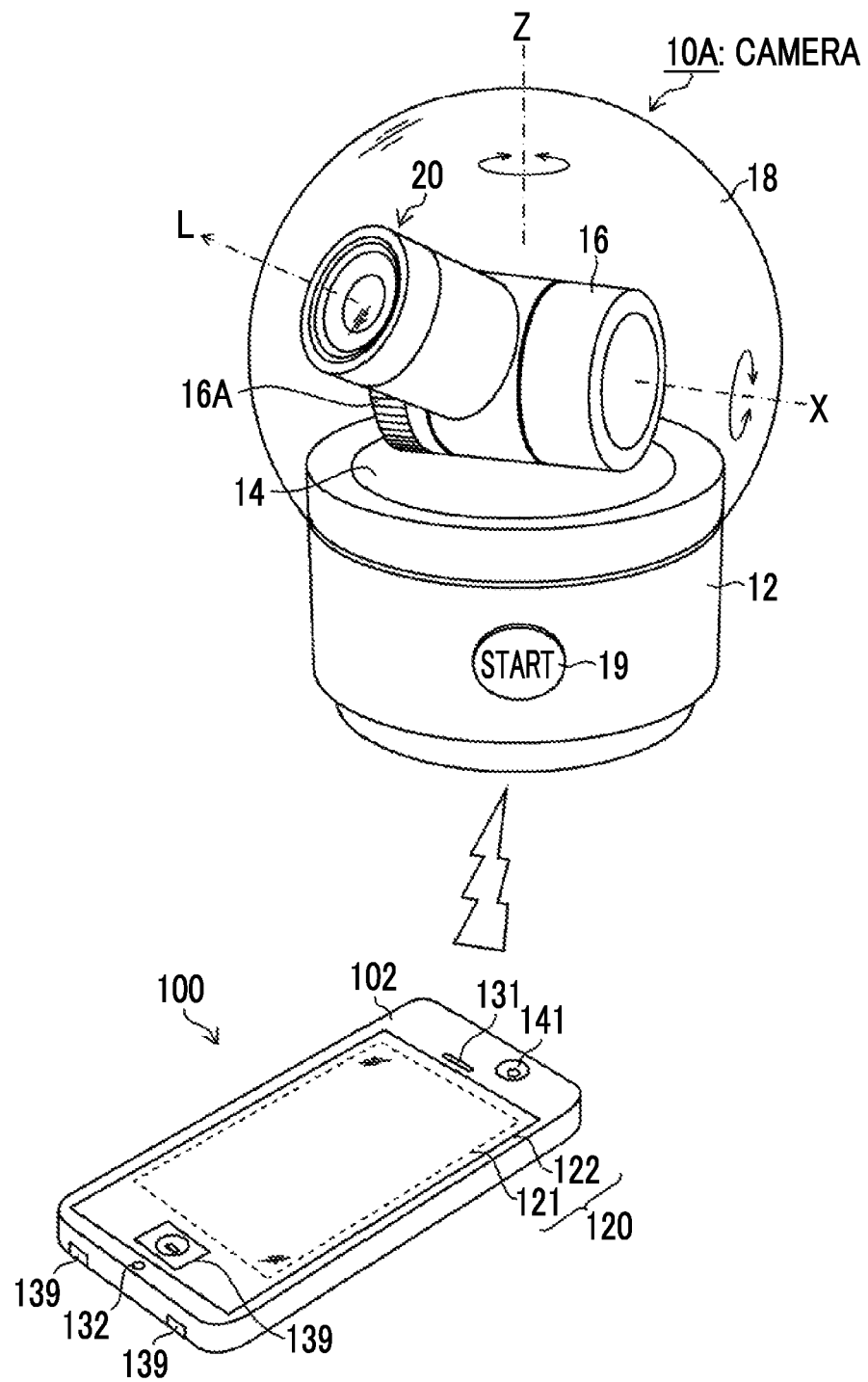
FIG. 12 is a conceptual diagram illustrating a state where a pan/tilt camera is connected to a multi-imaging apparatus in a wireless manner.

FIG. 12 is a conceptual diagram illustrating a state where a pan/tilt camera 10A which is the external imaging device 10 is connected to a multi-imaging apparatus (also referred to as a smartphone) 100 in a wireless manner.

The pan/tilt camera 10A includes, as main components, an apparatus body 12, a stand 14, and a holding portion 16 that is fixedly mounted on the stand 14 and holds a camera side imaging unit 20 to be rotatable, and a dome cover 18 that covers the camera side imaging unit 20.

Figure 13:
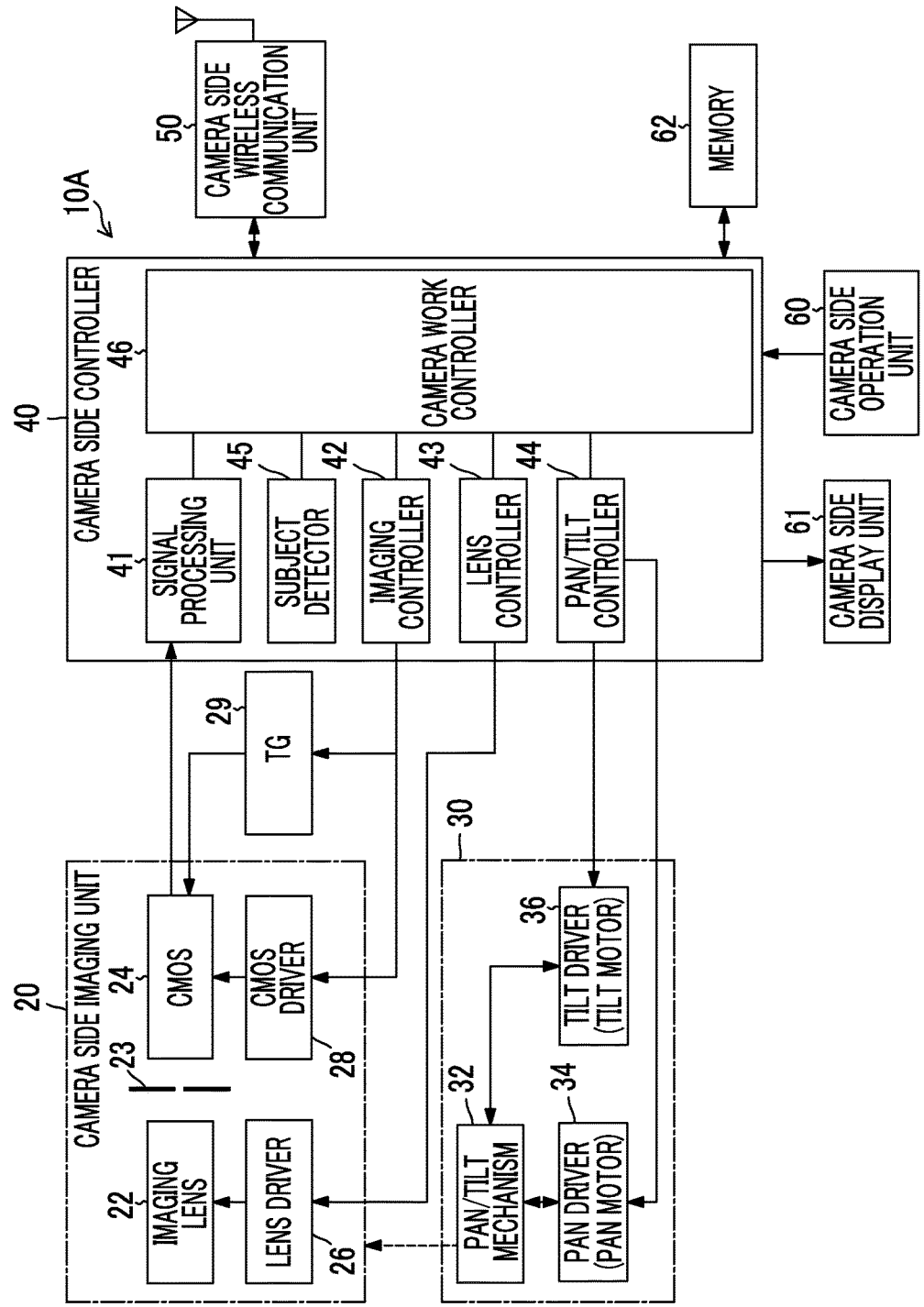
FIG. 13 is a block diagram illustrating an example of an internal configuration of a pan/tilt camera.

The stand 14 is disposed to be rotatable around a vertical axis Z of the apparatus body 12, and is rotated around the vertical axis Z using a pan driver 34 (FIG. 13).

The holding unit 16 includes a gear 16A provided on the same axis as a horizontal axis X, and rotates (tilt operation) upward and downward the camera side imaging unit 20 as a driving force is transmitted from a tilt driver 36 (FIG. 13) through the gear 16A.

It is preferable that the dome cover 18 is a cover for dust-proof and drip-proof and has a spherical shell shape having a predetermined thickness, in which an intersection between the horizontal axis X and the vertical axis Z is a curvature center, so that an optical performance of the camera side imaging unit 20 does not change regardless of an optical axis direction L of the camera side imaging unit 20.

Further, it is preferable that a tripod mounting portion (tripod screw holes, or the like) (not shown) is provided on a rear surface of the apparatus body 12.

An imaging start button 19 that gives an instruction for starting imaging and a power source switch (not shown) are provided in the pan/tilt camera 10A. Here, the pan/tilt camera 10A includes a camera side wireless communication unit 50 (see FIG. 13), and mainly performs wireless communication with an external terminal (in this example, the smartphone 100) to receive various operation instructions from the smartphone 100. Further, a live view image captured in the pan/tilt camera 10A or an image obtained through a main imaging operation thereof is transmitted to the smartphone 100 through the camera side wireless communication unit 50.

FIG. 13 is a block diagram illustrating an example of an internal configuration of the pan/tilt camera 10A which is the external imaging device 10. The same reference signs are given to the same blocks as those described in FIG. 2, and description thereof will not be repeated.

The example of the internal configuration of the pan/tilt camera 10A shown in FIG. 13 corresponds to a configuration in which a pan/tilt device 30, a pan/tilt controller 44, and a subject detector 45 are additionally provided in the configuration shown in FIG. 2.

The pan/tilt device 30 includes a pan/tilt mechanism 32, a pan driver 34, and a tilt driver 36. The pan/tilt mechanism 32 includes a pan mechanism that rotates the camera side imaging unit 20 in a horizontal direction (pan direction) with respect to the apparatus body 12 as shown in FIG. 1 and a tilt mechanism that rotates the camera side imaging unit 20 in a vertical direction (tilt direction) with respect to the apparatus body 12, as shown in FIG. 12. The pan/tilt mechanism 32 includes a home position sensor that detects a reference position of a rotational angle (pan angle) in the pan direction, and a home position sensor that detects a reference position of an inclined angle (tilt angle) in the tilt direction.

Each of the pan driver 34 and the tilt driver 36 includes a stepping motor and a motor driver, and outputs a driving force to the pan/tilt mechanism 32 to drive the pan/tilt mechanism 32.

The pan/tilt controller 44 is provided in the camera side controller 40. The pan/tilt controller 44 is a unit that controls the pan/tilt device 30. Specifically, in a case where an automatic tracking mode is set, the pan/tilt controller 44 controls the pan/tilt device 30 so that a subject detected by the subject detector 45 is disposed at the center of an angle of view. Further, in a case where the automatic tracking mode is not set, the pan/tilt controller 44 controls the pan/tilt device 30 according to instruction transmitted from the smartphone 100.

If any directional key in the cross key 124 shown in FIG. 4 is touch-operated, the controller 101 outputs a motor driving instruction for performing a pan operation or a tilt operation in a direction indicated by the touch-operated directional key. Further, if the center key in the cross key 124 is operated, the controller 101 outputs a motor driving instruction for repeating a pan operation or a tilt operation in a uniform pattern.

The subject detector 45 has a function for detecting, if a subject which is a tracking target is specified, the subject even when the subject moves. Specifically, first, a subject which is a tracking target is set automatically or manually, and then, an image of the subject which is the tracking target is detected from captured moving images sequentially obtained from the signal processing unit 41 using a face detection process or a pattern matching process. Since the face detection process or the pattern matching process performed in the subject detector 45 is known in the art, description thereof will not be made. Further, as another method for detecting a subject, in a case where the subject is a moving body, the subject may be detected by moving body detection.

In this way, by using the pan/tilt camera 10A as the external imaging device 10, it is possible to perform wide-range imaging using the external imaging device 10.

Next, usage examples of the pan/tilt camera 10A in a case where the pan/tilt camera 10A is used as the external imaging device 10 will be described.

(Usage Example 1 of Pan/Tilt Camera)

In this example, the pan/tilt camera 10A images a subject captured by the internal imaging device 140 of the multi-imaging apparatus 100 based on subject specifying information.

Figure 14:
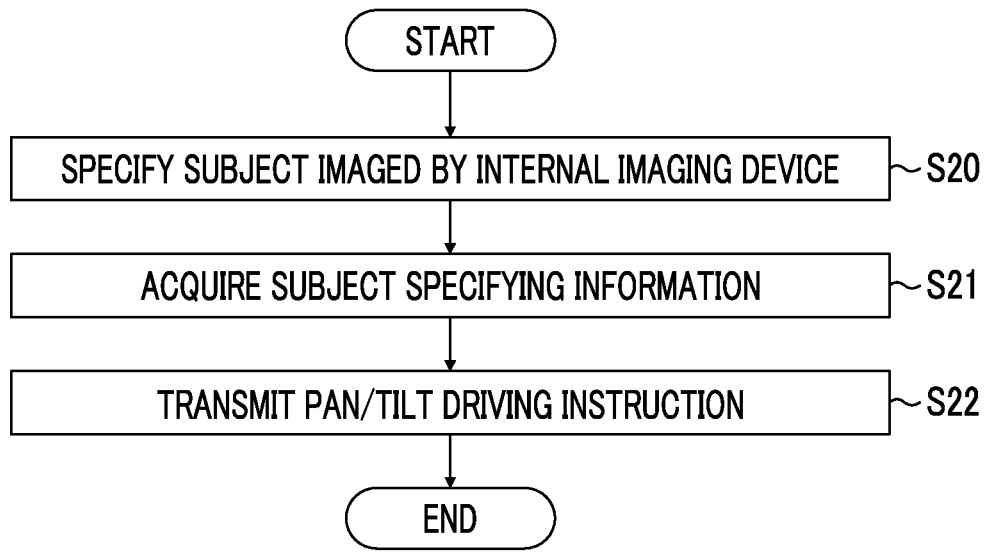
FIG. 14 is a flowchart illustrating an operation of a multi-imaging apparatus in a case where a pan/tilt camera is used in Usage Example 1.

FIG. 14 is a flowchart illustrating an operation of the multi-imaging apparatus 100 in a case where the pan/tilt camera 10A is used in Usage Example 1.

First, the multi-imaging apparatus 100 captures a subject using the internal imaging device 140, and specifies the captured subject (step S20). For example, the subject captured by the internal imaging device 140 is displayed on the display input unit 120 of the multi-imaging apparatus 100, and the subject is specified by a touch of a user, or the like. Then, subject specifying information of the specified subject is acquired by the controller 101 of the multi-imaging apparatus 100 (step S21). For example, the controller 101 acquires information for face recognition of the specified subject or information relating to pattern matching of the specified subject as the subject specifying information.

Then, the controller 101 transmits a pan/tilt driving instruction for controlling the pan/tilt mechanism 32 of the external imaging device 10 so that the subject captured by the internal imaging device 140 is also captured by the external imaging device 10 based on the subject specifying information to the external imaging device 10 through the wireless communication unit 110 (step S22). Further, the pan/tilt camera 10A receives the pan/tilt driving instruction through the camera side wireless communication unit 50, and controls the pan/tilt device 30 using the pan/tilt controller 44 based on the pan/tilt driving instruction.

As described above, in this example, the pan/tilt mechanism 32 of the external imaging device 10 is controlled, based on subject specifying information for specifying a subject captured by the internal imaging device 140, to capture the subject. Thus, it is possible to capture the same subject in the external imaging device 10 and the internal imaging device 140.

(Usage Example 2 of Pan/Tilt Camera)

In this example, the pan/tilt camera 10A images a subject captured by the internal imaging device 140 of the multi-imaging apparatus 100 based on position information and posture information.

Figure 15:
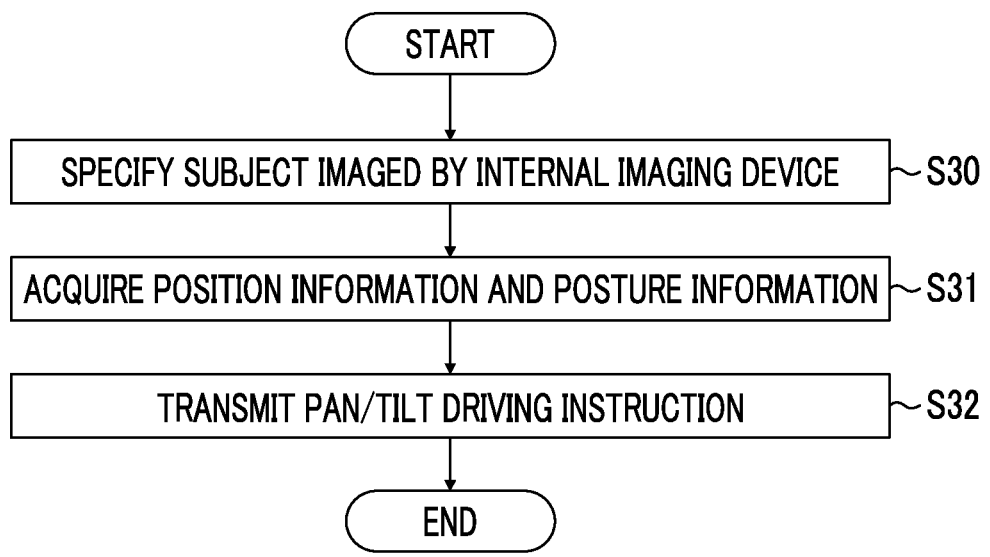
FIG. 15 is a flowchart illustrating an operation of a multi-imaging apparatus in a case where a pan/tilt camera is used in Usage Example 2.

FIG. 15 is a flowchart illustrating an operation of the multi-imaging apparatus 100 in a case where the pan/tilt camera 10A is used in Usage Example 2.

First, the multi-imaging apparatus 100 captures a subject using the internal imaging device 140, and specifies the captured subject (step S30). For example, the subject captured by the internal imaging device 140 is displayed on the display input unit 120 of the multi-imaging apparatus 100, and the subject is specified by a touch of a user, or the like. Then, the controller 101 of the multi-imaging apparatus 100 acquires position information of the internal imaging device 140 and position information of the pan/tilt camera 10A (step S31). The position information of the internal imaging device 140 is acquired from the GPS receiver unit 170 of the multi-imaging apparatus 100, and the position information of the pan/tilt camera 10A may be acquired from a GPS or the like provided in the pan/tilt camera 10A. Further, the controller 101 of the multi-imaging apparatus 100 acquires posture information of the internal imaging device 140 and posture information of the pan/tilt camera 10A (step S31). The controller 101 acquires the posture information of the multi-imaging apparatus 100 using a triaxial acceleration sensor provided in the multi-imaging apparatus 100, or the like, to thereby acquire information relating to a direction of an optical axis of the internal imaging device 140. Further, the controller 101 acquires the posture information of the pan/tilt camera 10A using a triaxial acceleration sensor provided in the pan/tilt camera 10A, the pan/tilt mechanism 32, or the like, to thereby acquire information relating to a direction of an optical axis of the pan/tilt camera 10A.

Then, the controller 101 transmits a pan/tilt driving instruction for controlling the pan/tilt mechanism 32 of the external imaging device 10 so that the subject captured by the internal imaging device 140 is also captured by the external imaging device 10 based on the position information and the posture information to the external imaging device 10 through the wireless communication unit 110 (step S32). Further, the pan/tilt camera 10A receives the pan/tilt driving instruction through the camera side wireless communication unit 50, and controls the pan/tilt device 30 using the pan/tilt controller 44 based on the pan/tilt driving instruction.

As described above, in this example, since the pan/tilt mechanism 32 of the external imaging device 10 is controlled to capture a subject based on position information and posture information, it is also possible to capture a subject captured by the internal imaging device 140 in the external imaging device 10.

Further, in this example, the pan/tilt camera 10A may image a subject captured by the internal imaging device 140 of the multi-imaging apparatus 100 based on position information, posture information, and distance information.

Figure 16:
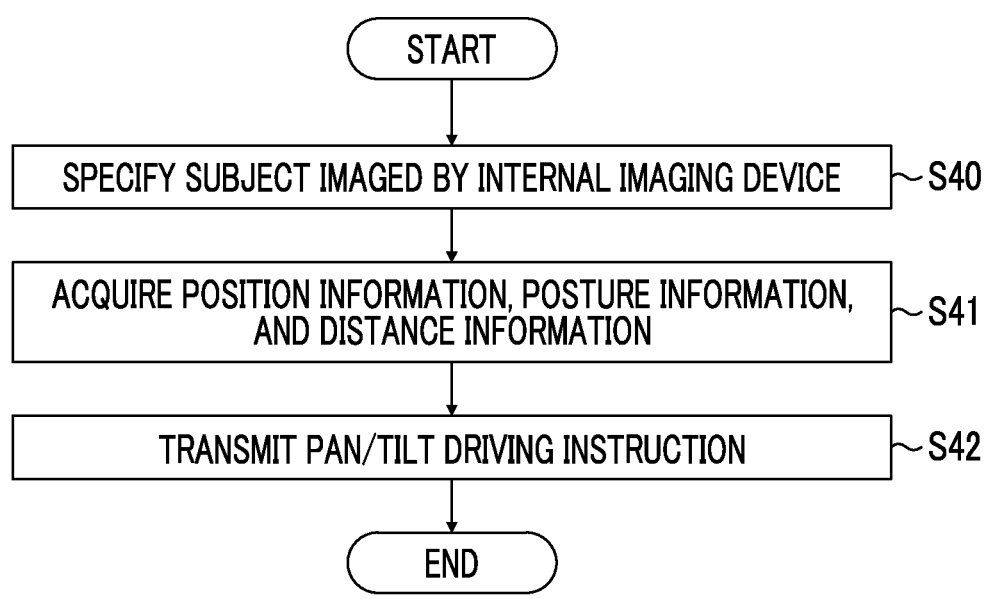
FIG. 16 is a flowchart illustrating an operation of a multi-imaging apparatus in a case where a pan/tilt camera is used in Usage Example 2.

FIG. 16 is a flowchart illustrating an operation of the multi-imaging apparatus 100 in a case where the pan/tilt camera 10A is used in Usage Example 2.

First, the multi-imaging apparatus 100 captures a subject using the internal imaging device 140, and specifies the captured subject (step S40). For example, the subject captured by the internal imaging device 140 is displayed on the display input unit 120 of the multi-imaging apparatus 100, and the subject is specified by a touch of a user, or the like. Then, the controller 101 of the multi-imaging apparatus 100 acquires position information of the internal imaging device 140 and position information of the pan/tilt camera 10A (step S41). The position information of the internal imaging device 140 is acquired from the GPS receiver unit 170 of the multi-imaging apparatus 100, and the position information of the pan/tilt camera 10A may be acquired from a GPS or the like provided in the pan/tilt camera 10A. Further, the controller 101 of the multi-imaging apparatus 100 acquires posture information of the internal imaging device 140, posture information of the pan/tilt camera 10A, and distance information indicating a distance between the internal imaging device 140 and the subject (step S41). The controller 101 acquires the posture information of the multi-imaging apparatus 100 using a triaxial acceleration sensor provided in the multi-imaging apparatus 100, or the like, to thereby acquire information relating to a direction of an optical axis of the internal imaging device 140. Further, the controller 101 acquires the posture information of the pan/tilt camera 10A using a triaxial acceleration sensor provided in the pan/tilt camera 10A, the pan/tilt mechanism 32, or the like, to thereby acquire information relating to a direction of an optical axis of the pan/tilt camera 10A. Furthermore, the controller 101 of the multi-imaging apparatus 100 acquires information relating to a distance between the internal imaging device 140 and the subject captured by the internal imaging device 140 (step S41). The information relating to the distance between the internal imaging device 140 and the subject may be acquired by known means. For example, the controller 101 of the multi-imaging apparatus 100 may acquire the distance to the subject using the internal imaging device 140, or may acquire the distance to the subject using distance acquisition means such as laser with respect to the subject.

Then, the controller 101 transmits a pan/tilt driving instruction for controlling the pan/tilt mechanism 32 of the external imaging device 10 so that the subject captured by the internal imaging device 140 is also captured by the external imaging device 10 based on the position information, the posture information, and the distance information to the external imaging device 10 through the wireless communication unit 110 (step S42). Further, the pan/tilt camera 10A receives the pan/tilt driving instruction through the camera side wireless communication unit 50, and controls the pan/tilt device 30 using the pan/tilt controller 44 based on the pan/tilt driving instruction.

As described above, in this example, since the pan/tilt mechanism 32 of the external imaging device 10 is controlled to capture a subject based on position information, posture information, and distance information, it is also possible to capture a subject captured by the internal imaging device 140 in the external imaging device 10.

(Usage Example 3 of Pan/Tilt Camera)

In this example, the pan/tilt camera 10A performs automatic tracking of a subject according to switching between the front camera (first imaging unit 141) and the back camera (second imaging unit 142) of the multi-imaging apparatus 100. That is, the controller 101 of the multi-imaging apparatus 100 transmits an automatic tracking instruction for instructing the pan/tilt camera 10A to perform automatic tracking based on driving of the pan/tilt mechanism 32 to the external imaging device 10 through the wireless communication unit 110 according to switching between the first imaging unit 141 and the second imaging unit 142 in the internal imaging device 140. Here, the automatic tracking of the subject refers to an operation of the pan/tilt mechanism 32 for tracking a specified subject. Further, an automatic tracking target may be specified by the multi-imaging apparatus 100 and may be detected by the subject detector 45, as described in Usage Examples 1 and 2. Alternatively, a subject specified by the pan/tilt camera 10A may be automatically tracked.

As described above, in this example, the pan/tilt mechanism 32 of the external imaging device 10 performs automatic tracking according to switching between the first imaging unit 141 and the second imaging unit 142. Thus, in this example, it is possible to cause the external imaging device 10 to perform automatic tracking by operating the multi-imaging apparatus 100.

(Usage Example 4 of Pan/Tilt Camera)

In this example, the pan/tilt mechanism 32 of the pan/tilt camera 10A is controlled in association with posture information of the multi-imaging apparatus 100. That is, the controller 101 of the multi-imaging apparatus 100 acquires the posture information of the multi-imaging apparatus 100 from the motion sensor unit 180, and transmits a pan/tilt driving instruction for controlling the pan/tilt mechanism 32 of the pan/tilt camera 10 in association with the posture information to the external imaging device 10. For example, if the multi-imaging apparatus 100 is transversely inclined, the pan/tilt mechanism 32 is controlled to perform a pan operation, and if the multi-imaging apparatus 100 is longitudinally inclined, the pan/tilt mechanism 32 is controlled to perform a tilt operation.

As described above, in this example, since the pan/tilt mechanism 32 of the external imaging device 10 is controlled in association with posture information of the multi-imaging apparatus 100 in a case where the multi-imaging apparatus 100 is operated, it is possible to intuitively control the pan/tilt mechanism 32 of the external imaging device 10 using the multi-imaging apparatus 100.

Third Embodiment

Next, a third embodiment of the invention will be described. In this embodiment, the external imaging device 10 includes an electronic pan/tilt mechanism.

Figure 17:
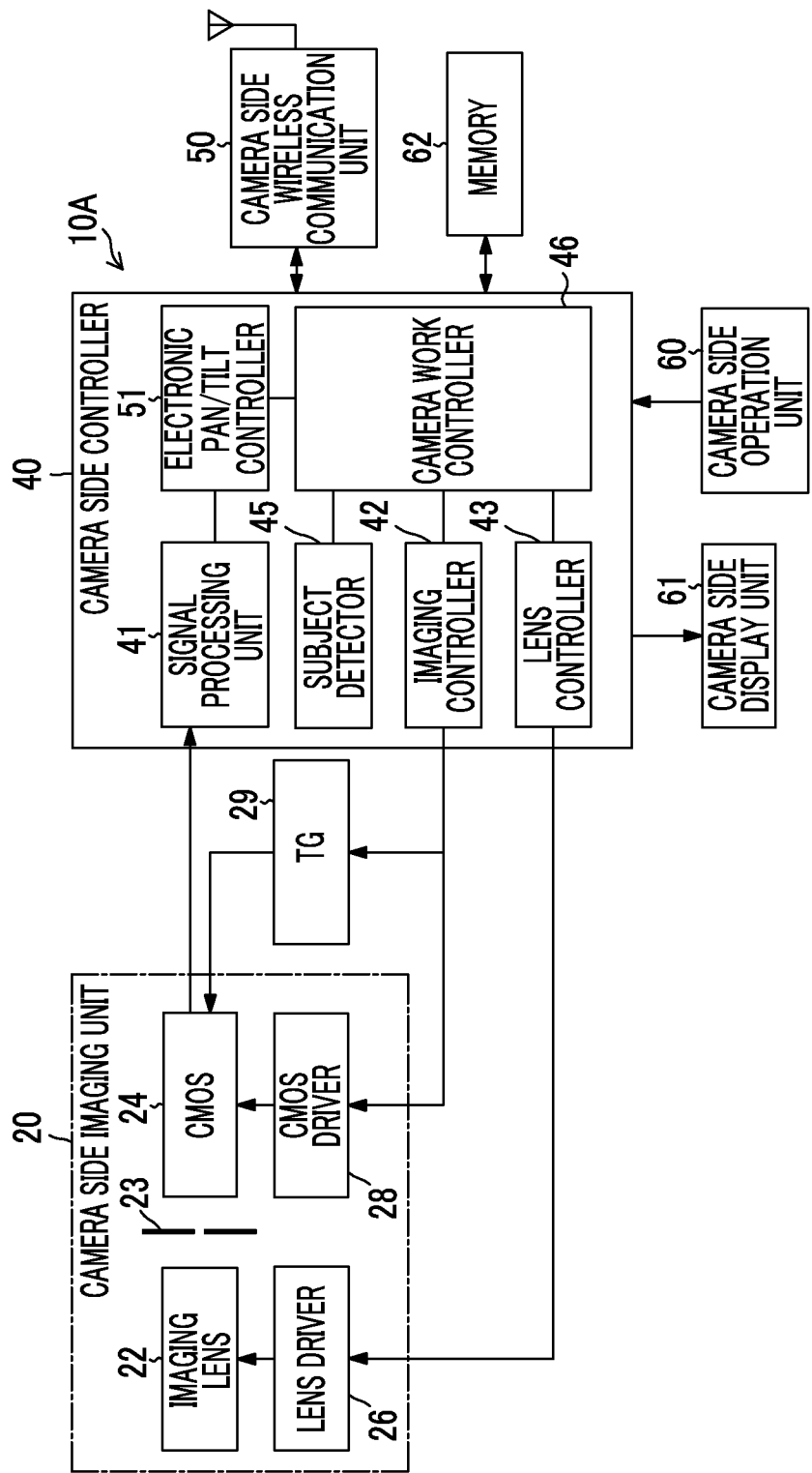
FIG. 17 is a block diagram illustrating an internal configuration of an imaging apparatus having an electronic pan/tilt mechanism.

FIG. 17 is a block diagram illustrating an internal configuration of an imaging device including an electronic pan/tilt mechanism of the external imaging device 10 of this embodiment. The same reference signs are given to the same blocks as those described in FIG. 2 and FIG. 13, and description thereof will not be repeated.

The block diagram of the pan/tilt camera 10A shown in FIG. 17 includes an electronic pan/tilt controller 51, compared with the block diagrams shown in FIG. 2 and FIG. 13. Further, it is preferable that the imaging lens 22 employs a wide angle lens.

The electronic pan/tilt controller 51 causes an image to be displayed as if an imaging unit performs a pan operation or a tilt operation in a pseudo manner by trimming only a specific region of an acquired image for display. Since a specific method for a pan/tilt operation employs a known technique, specific description thereof will not be made.

Figure 18:
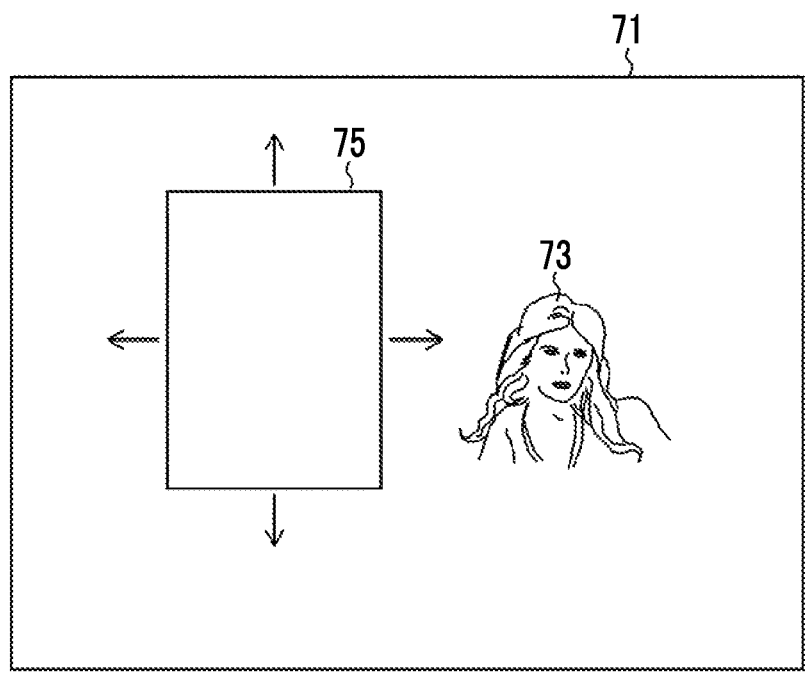
FIG. 18 is a diagram illustrating a pan operation and a tilt operation of an electronic pan/tilt mechanism.

FIG. 18 is a diagram illustrating a pan operation and a tilt operation of an electronic pan/tilt mechanism. In FIG. 18, a live view image (second live view image) 71 acquired by the external imaging device 10, a subject 73, and a trimming region (specific region) 75 are shown. An example of the electronic pan/tilt mechanism of this embodiment is shown in FIG. 18, in which by moving the position of the trimming region 75 in a pan direction or a tilt direction in the live view image 71, a display may be performed as if the imaging unit performs a pan operation or a tilt operation in a pseudo manner. Here, on the display input unit 120 of the multi-imaging apparatus 100, the live view image 71 in the trimming region 75 is displayed. It is preferable that the trimming region 75 has the same aspect ratio as that of each display region in the above-described layouts.

As described above, since the external imaging device 10 includes an electronic pan/tilt mechanism, it is possible to perform a display as if an imaging unit performs a pan operation or a tilt operation although the external imaging device 10 does not include a mechanical pan/tilt mechanism. Further, in this embodiment, Usage Examples 1 to 4 described above may be similarly applied.

Hereinbefore, the embodiments of the invention have been described, but the invention is not limited to the above-described embodiments, and may include various modifications in a range without departing from the concept of the invention. Explanation of References 10: external imaging device
20: camera side imaging unit
22: imaging lens
23: diaphragm
24: imaging element
26: lens driver
28: CMOS driver
40: camera side controller
41: signal processing unit
42: imaging controller
43: lens controller
46: camera work controller
50: camera side wireless communication unit
60: camera side operation unit
61: camera side display unit
62: memory
100: multi-imaging apparatus
101: controller
102: housing
110: wireless communication unit
120: display input unit
121: display panel
122: operation panel
130: call unit
131: speaker
132: microphone
139: operation unit
140: internal imaging device
141: first imaging unit
142: second imaging unit
150: storage unit
151: internal storage unit
152: external storage unit
160: external input/output unit
170: GPS receiver unit
180: motion sensor unit
190: power source unit

What is claimed is:

1. A multi-imaging apparatus comprising:
a display unit;
an internal imaging device that acquires a first live view image or a first image captured by a main imaging operation thereof;
a wireless communication unit that performs wireless communication with an external imaging device that acquires a second live view image or a second image captured by a main imaging operation thereof; and
a controller that is connected to the display unit, the internal imaging device, and the wireless communication unit,
wherein the controller receives an input of the first live view image from the internal imaging device, receives the second live view image from the external imaging device through the wireless communication unit, and causes the display unit to display the input first live view image and the received second live view image as a multi-live view,
the external imaging device includes a mechanical pan/tilt mechanism or an electronic pan/tilt mechanism that displays only a specific region in the second image to perform a pan/tilt control, and
the controller outputs a motor driving instruction for driving the mechanical pan/tilt mechanism or the electronic pan/tilt mechanism, and
wherein the controller
acquires position information of the internal imaging device and the external imaging device,
acquires posture information of the internal imaging device and the external imaging device, and
transmits a pan/tilt driving instruction for controlling the pan/tilt mechanism of the external imaging device so that the subject captured by the internal imaging device is also captured by the external imaging device based on the position information and the posture information, to the external imaging device.

2. The multi-imaging apparatus according to claim 1, wherein the controller acquires distance information indicating a distance between the internal imaging device and the subject, and transmits a pan/tilt driving instruction for controlling the pan/tilt mechanism of the external imaging device so that the subject captured by the internal imaging device is also captured by the external imaging device based on the position information, the posture information, and the distance information, to the external imaging device.

3. The multi-imaging apparatus according to claim 1, wherein the controller acquires posture information of the multi-imaging apparatus, and transmits a pan/tilt driving instruction for controlling the pan/tilt mechanism of the external imaging device in association with the posture information to the external imaging device.

4. The multi-imaging apparatus according to claim 1, further comprising:

an operation unit that instructs a main imaging operation, wherein the controller transmits, if the main imaging operation is instructed by the operation unit, an imaging instruction for instructing the main imaging operation of the external imaging device to the external imaging device.

5. The multi-imaging apparatus according to claim 4, wherein the controller causes, if a main imaging operation is instructed by the operation unit, the internal imaging device and the external imaging device to perform the main imaging operations in synchronization.

6. The multi-imaging apparatus according to claim 1, wherein the internal imaging device includes a first imaging unit and a second imaging unit, and wherein the controller acquires the first live view image or the first image from both or one of the first imaging unit and the second imaging unit.

7. The multi-imaging apparatus according to claim 6, wherein the external imaging device includes a mechanical pan/tilt mechanism or an electronic pan/tilt mechanism that displays only a specific region in the second image to perform a pan/tilt control, and wherein the controller transmits, in a case where switching between imaging of the first imaging unit and imaging of the second imaging unit is performed, an automatic tracking instruction for instructing the external imaging device to perform automatic tracking based on driving of the pan/tilt mechanism to the external imaging device.

8. A multi-imaging apparatus that transmits the second live view image or the second image to the multi-imaging apparatus according to claim 1.

9. The multi-imaging apparatus according to claim 1, further comprising:

a storage unit, wherein the controller acquires the first image and the second image captured by the main imaging operations of the internal imaging device and the external imaging device, respectively, composes the acquired first image and second image in the same form of that of the live view images displayed as the multi-live view, and stores an image obtained by the composition in the storage unit.

10. The multi-imaging apparatus according to claim 1, wherein the controller acquires subject specifying information for specifying a subject captured by the internal imaging device, displayed on the display unit, and transmits a pan/tilt driving instruction for controlling the pan/tilt mechanism of the external imaging device so that the subject captured by the internal imaging device is also captured by the external imaging device based on the subject specifying information, to the external imaging device.

11. A multi-imaging method comprising:

an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, wherein the first live view image is input in the internal imaging step and the second live view image is received in the external imaging step, the method further comprising:

a display step of displaying the first live view image and the second live view image as a multi-live view, wherein the external imaging step includes a step of acquiring the second live view image or the second image captured by the external imaging device that includes a mechanical pan/tilt mechanism or an electronic pan/tilt mechanism that displays only a specific region in the second image to perform a pan/tilt control, and a step of outputting a motor driving instruction for driving the mechanical pan/tilt mechanism or the electronic pan/tilt mechanism, a step of acquiring position information of an internal imaging device and the external imaging device;

a step of acquiring posture information of the internal imaging device and the external imaging device; and a step of transmitting a pan/tilt driving instruction for controlling the pan/tilt mechanism of the external imaging device so that the subject captured by the internal imaging device is also captured in the external imaging step based on the position information and the posture information, to the external imaging device.

12. The multi-imaging method according to claim 11, further comprising:

a step of acquiring distance information indicating a distance between the internal imaging device and the subject; and a step of transmitting a pan/tilt driving instruction for controlling the pan/tilt mechanism of the external imaging device so that the subject captured by the internal imaging device is also captured in the external imaging step based on the position information, the posture information, and the distance information, to the external imaging device.

13. The multi-imaging method according to claim 11, further comprising:

a step of acquiring posture information of the multi-imaging apparatus, and a step of transmitting a pan/tilt driving instruction for controlling the pan/tilt mechanism of the external imaging device based on the posture information of the multi-imaging apparatus to the external imaging device.

14. The multi-imaging method according to claim 11, further comprising:

a step of acquiring the first image and the second image captured by the main imaging operations in the internal imaging step and the external imaging step, respectively;

a step of composing the acquired first image and second image in the same form of that of the live view images displayed as the multi-live view; and a step of storing an image obtained by the composition.

15. A non-transitory recording medium on which a computer-readable code of a program that causes a computer to execute a multi-imaging method, the method comprising:

an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, wherein the first live view image is input in the internal imaging step and the second live view image is received in the external imaging step, the method further comprising:

a display step of displaying the first live view image and the second live view image as a multi-live view, wherein the external imaging step includes a step of acquiring the second live view image or the second image captured by the external imaging device that includes a mechanical pan/tilt mechanism or an electronic pan/tilt mechanism that displays only a specific region in the second image to perform a pan/tilt control, and a step of outputting a motor driving instruction for driving the mechanical pan/tilt mechanism or the electronic pan/tilt mechanism, wherein a position information of the internal imaging device and an external imaging device is acquired, the posture information of the internal imaging device and the external imaging device is acquired, and a pan/tilt driving instruction for controlling the pan/tilt mechanism of the external imaging device is transmitted so that the subject captured by the internal imaging device is also captured by the external imaging device based on the position information and the posture information, to the external imaging device.

16. A multi-imaging apparatus comprising:

a display unit;

an internal imaging device that acquires a first live view image or a first image captured by a main imaging operation thereof;

a wireless communication unit that performs wireless communication with an external imaging device that acquires a second live view image or a second image captured by a main imaging operation thereof; and a controller that is connected to the display unit, the internal imaging device, and the wireless communication unit, wherein the controller receives an input of the first live view image from the internal imaging device, receives the second live view image from the external imaging device through the wireless communication unit, and causes the display unit to display the input first live view image and the received second live view image as a multi-live view, the external imaging device includes a mechanical pan/tilt mechanism or an electronic pan/tilt mechanism that displays only a specific region in the second image to perform a pan/tilt control, and the controller outputs a motor driving instruction for driving the mechanical pan/tilt mechanism or the electronic pan/tilt mechanism, wherein the controller acquires subject specifying information for specifying a subject captured by the internal imaging device, displayed on the display unit, and transmits the acquired subject specifying information and a pan/tilt driving instruction for controlling the pan/tilt mechanism of the external imaging device so that the subject captured by the internal imaging device is also captured by the external imaging device based on the subject specifying information, to the external imaging device.

17. A multi-imaging method comprising:

an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, wherein the first live view image is input in the internal imaging step and the second live view image is received in the external imaging step, the method further comprising:

a display step of displaying the first live view image and the second live view image as a multi-live view, wherein the external imaging step includes a step of acquiring the second live view image or the second image captured by the external imaging device that includes a mechanical pan/tilt mechanism or an electronic pan/tilt mechanism that displays only a specific region in the second image to perform a pan/tilt control, a step of outputting a motor driving instruction for driving the mechanical pan/tilt mechanism or the electronic pan/tilt mechanism;

a step of acquiring subject specifying information for specifying a subject captured in the internal imaging step; and a step of transmitting the acquired subject specifying information and a pan/tilt driving instruction for controlling the pan/tilt mechanism of the external imaging device so that the subject captured in the internal imaging step is also captured by the external imaging device based on the subject specifying information, to the external imaging device.

18. A non-transitory recording medium on which a computer-readable code of a program that causes a computer to execute a multi-imaging method, the method comprising:

an internal imaging step of acquiring a first live view image or a first image captured by a main imaging operation thereof; and an external imaging step of acquiring, from an external imaging device that acquires a second live view image or a second image captured by a main imaging operation thereof, the second live view image or the second image through wireless communication, wherein the first live view image is input in the internal imaging step and the second live view image is received in the external imaging step, the method further comprising:

a display step of displaying the first live view image and the second live view image as a multi-live view, wherein the external imaging step includes a step of acquiring the second live view image or the second image captured by the external imaging device that includes a mechanical pan/tilt mechanism or an electronic pan/tilt mechanism that displays only a specific region in the second image to perform a pan/tilt control, and a step of outputting a motor driving instruction for driving the mechanical pan/tilt mechanism or the electronic pan/tilt mechanism, wherein subject specifying information is acquired for specifying a subject captured by the internal imaging device, displayed on the display unit, and a pan/tilt driving instruction and the acquired subject specifying information is transmitted for controlling the pan/tilt mechanism of the external imaging device so that the subject captured by the internal imaging device is also captured by the external imaging device based on the subject specifying information, to the external imaging device.

\* \* \* \* \*